(12) United States Patent
Fujimori et al.

(10) Patent No.: US 7,085,034 B2
(45) Date of Patent: Aug. 1, 2006

(54) OPTICAL DEVICE AND PROJECTOR

(75) Inventors: Motoyuki Fujimori, Suwa (JP); Masami Murata, Shiojiri (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/080,488

(22) Filed: Mar. 16, 2005

(65) Prior Publication Data
US 2005/0213227 A1   Sep. 29, 2005

(30) Foreign Application Priority Data
Mar. 23, 2004   (JP)   ............................. 2004-084808

(51) Int. Cl.
*G02F 1/01* (2006.01)

(52) U.S. Cl. .................. 359/288; 359/245; 359/554; 353/52; 353/54

(58) Field of Classification Search ............... 359/245, 359/288, 554; 353/52, 54, 60, 61, 119
See application file for complete search history.

(56) References Cited

U.S. PATENT DOCUMENTS 6,751,027 B1 * 6/2004 Van Den Bossche et al. .......................... 359/634

FOREIGN PATENT DOCUMENTS

JP   A 01-159684   6/1989

* cited by examiner

*Primary Examiner*—Hung X. Dang
*Assistant Examiner*—Joseph Martinez
(74) *Attorney, Agent, or Firm*—Oliff & Berridge, PLC

(57) ABSTRACT

An optical device (44) includes three optical modulators, three optical modulator holders (447), a plurality of fluid circulating members (440), a cross dichroic prism (444), a fluid branching section (446), a fluid feed-in section (449) and a fluid pressurizing/feeding section (445). The three optical modulator holders (447) are fitted respectively to the three light-incident surfaces of the cross dichroic prism (444) through three supporting members (448). The fluid feed-in section (449) is fitted to the top surface of the cross dichroic prism (444). The fluid branching section (446) and the fluid pressurizing/feeding section (445) are laid one on the other and fitted to the lower surface of the cross dichroic prism (444).

15 Claims, 13 Drawing Sheets

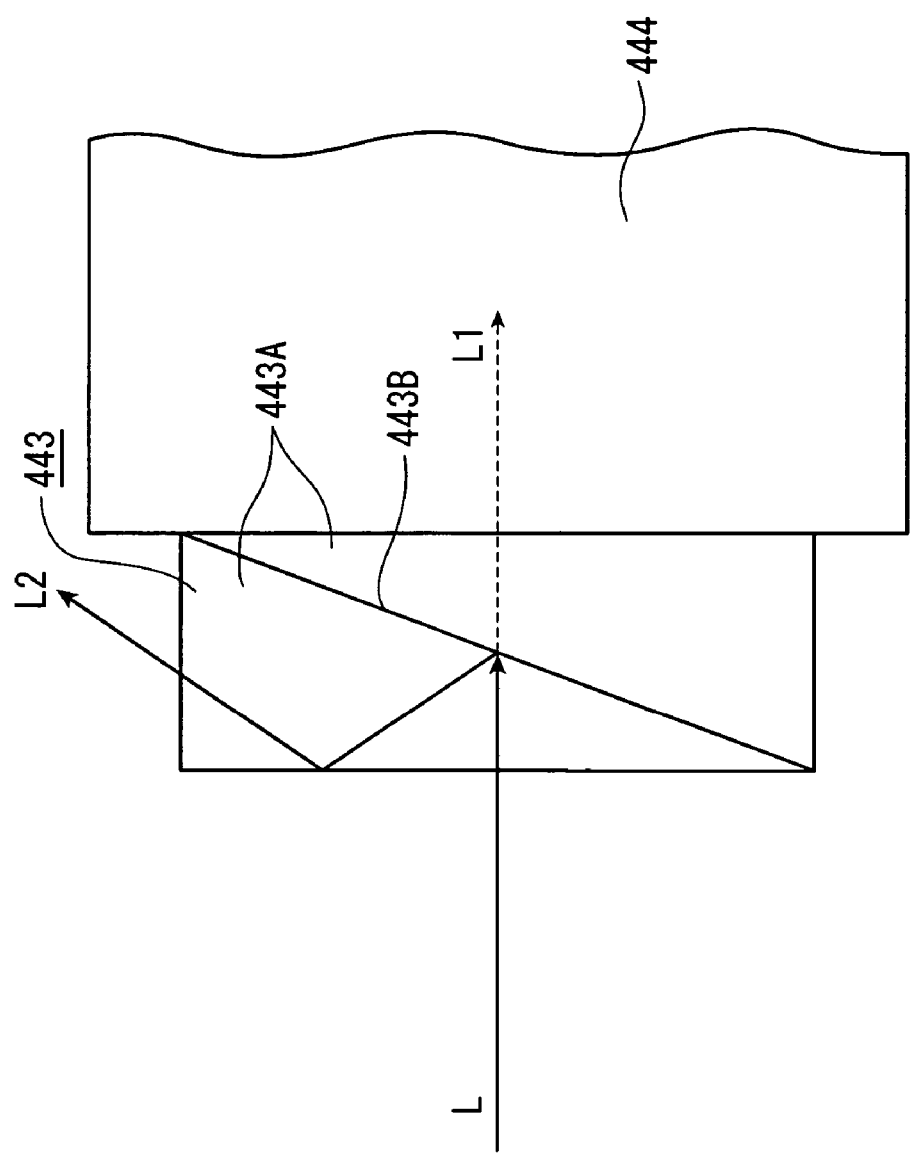

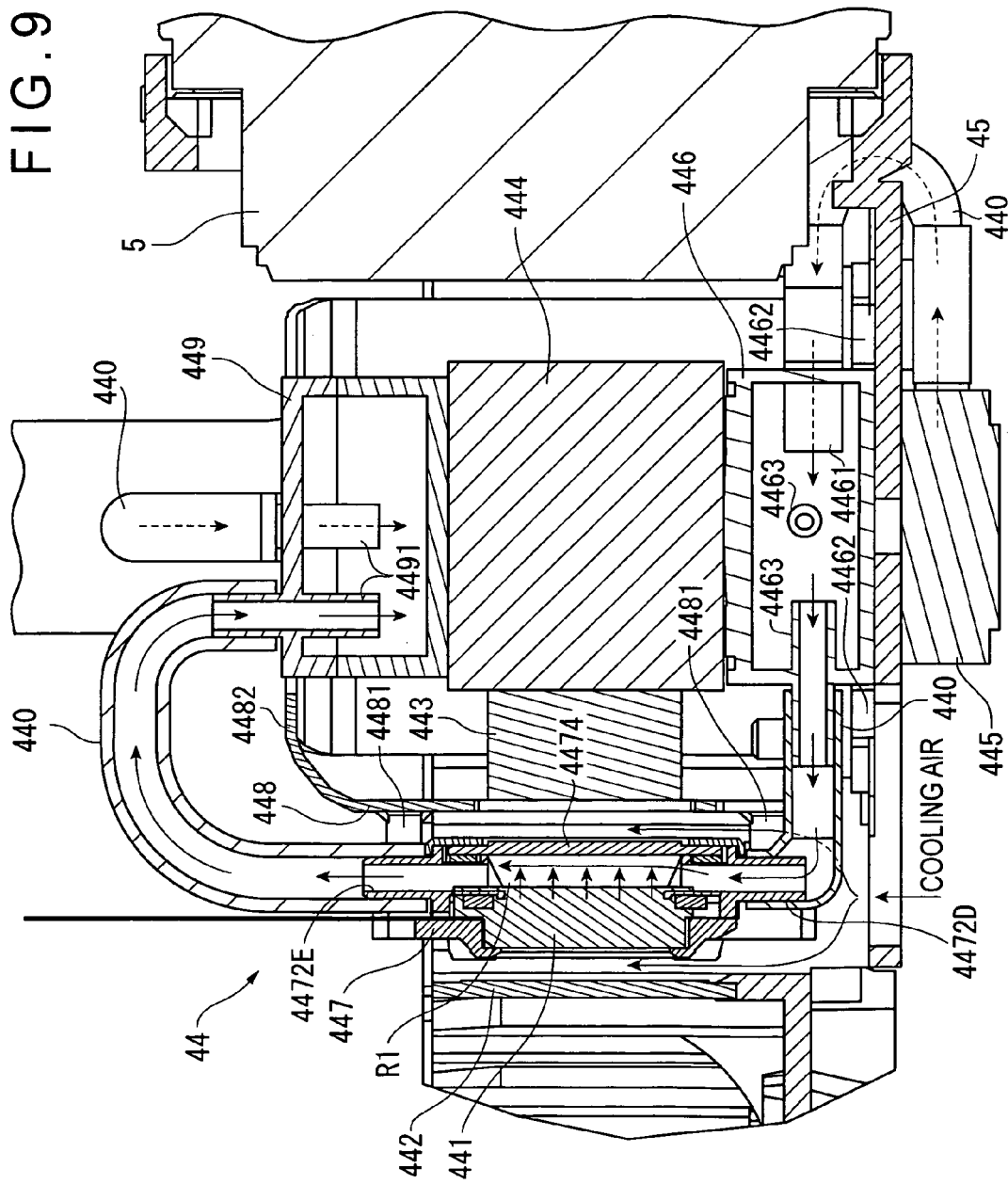

OPTICAL DEVICE AND PROJECTOR

BACKGROUND OF THE INVENTION

1. Field of the Invention

The present invention relates to an optical device and a projector.

2. Description of the Related Art

Projectors including an optical modulator for modulating light beams emitted from a light source according to image information supplied to the projector and a projection optical device for enlarging and projecting the light beam modulated by the optical modulator are known.

An active matrix drive type optical modulator formed by using a pair of substrate and an electro-optical material such as liquid crystal contained between the substrates in a hermetically sealed state is generally used for the optical modulator. More specifically, the paired substrates of the optical modulator include a drive substrate on which data lines for applying a drive voltage to the liquid crystal, scanning lines, switching elements, pixel electrodes, etc. are arranged and an opposite electrode on which a common electrode, a black mask, etc. are arranged.

Additionally, an incident-side polarization plate and an irradiation-side polarizator that are adapted to transmit lights beam having a predetermined polarization axis are arranged respectively at the light-incident side and the light-irradiation side.

When light beams emitted from the light source are irradiated onto the optical modulator, the temperature of the optical modulator is apt to rise because of the absorption of light of the liquid crystal layer, that of the data lines and the scanning lines formed on the drive substrate and that of the black matrix formed on the opposite substrate. Additionally, of the light beams emitted from the light source and the light beams transmitted through the optical modulator, those that do not have a predetermined polarization axis are absorbed by polarization plates so that the polarization plates are apt to generate heat.

Thus, projectors having such an optical element in the inside and equipped with a cooling device using cooling fluid have been proposed for the purpose of alleviating the temperature rise of the optical element (see, for example, Japanese Patent Laid-Open Publication No. Hei 1-159684).

The cooling device as described in the above-cited patent document has a cooling chamber adapted to support the optical modulator and the polarization plates in a mutually separated state and filled with cooling fluid in the inside. The cooling chamber is connected to a radiator and held in communication with a radiator and a fluid pump typically by way of tubes that allows cooling fluid to flow through the inside thereof. Thus, the cooling fluid in the inside circulates through the flow path of the cooling chamber—radiator—fluid pump—cooling chamber that are connected by tubes or the like. With this arrangement, the heat generated in the optical modulator and the polarization plates by the light beams emitted from the light source is directly discharged to the cooling fluid.

However, the projector described in the above-cited patent document is accompanied by a problem that it has large dimensions and hence does not allow easy handling because the cooling chamber, the radiator and the fluid pump are separated from each other but connected to each other by tubes or the like in order to make them communicate with each other.

Additionally, if the cooling device is equipped with a tank for temporarily storing cooling fluid in order to raise the volume of cooling fluid that is used in the cooling device and improve the efficiency of cooling the optical element, the dimensions of the cooling device increase further to make it less handleable.

Particularly, when plural optical modulators are used, the above problem becomes more remarkable.

SUMMARY OF THE INVENTION

A principal object of the present invention is to provide an optical device and a projector that can efficiently cool the optical modulator thereof by cooling fluid and whose dimensions can be reduced if including plural optical modulators.

An optical device according to an aspect of the present invention is formed by arranging a plurality of optical modulators for forming optical images by modulating light beams emitted from a light source according to image information. The device includes: a plurality of optical modulator holders respectively having cooling chambers, in which cooling fluid is sealed, for holding the plurality of optical modulators so as to allow them to transmit heat to the cooling fluid contained in the cooling chambers; a plurality of fluid circulating members communicated with the cooling chambers of the optical modulator holders for guiding the cooling fluid to the outside of the cooling chambers and again guiding the cooling fluid into the inside of the cooling chambers; a color combining optical device having a plurality of light-incident surfaces, on which the plurality of optical modulator holders are respectively attached, for combining the light beams modulated by the plurality of optical modulators; a fluid branching section arranged on the flow paths of cooling fluid formed by the plurality of fluid circulating members and adapted to store cooling fluid therein and allow the cooling fluid to branch to each of the plurality of optical modulator holders to flow into each of the cooling chambers; a fluid feed-in section arranged on the flow paths of cooling fluid formed by the plurality of fluid circulating members and adapted to accumulate the cooling fluid therein and to collectively feed the cooling fluid flowed out from the cooling chambers through the plurality of fluid circulating members; and a fluid pressurizing/feeding section arranged on the flow paths of cooling fluid formed by the plurality of fluid circulating members for feeding in the cooling fluid from the inside of the fluid feed-in section through the plurality of fluid circulating members and pressurizing and feeding out the fed cooling fluid to the inside of the fluid branching section through the plurality of fluid circulating members so as to force the circulation of the cooling fluid; in which the fluid branching section and the fluid pressurizing/feeding section are arranged one on the other on one of the surfaces of the color combining optical device intersecting the plurality of light-incident surfaces, and the fluid feed-in section is fitted to the other one of the surfaces of the color combining optical device intersecting the plurality of light-incident surfaces.

As for the positional relationship of the fluid branching section and the fluid pressurizing/feeding section, the fluid branching section may be arranged closer to the color combining optical device or, alternatively, the fluid pressurizing/feeding section may be arranged close to the color combining optical device.

The optical modulator holders may be directly fitted to the respective light-incident surfaces of the color combining optical device or, alternatively, they may be fitted to the respective light-incident surfaces by way of some other member.

According to the present invention, the plurality of optical modulator holders are fitted to the respective light-incident surfaces of the color combining optical device. The fluid branching section and the fluid pressurizing/feeding section are arranged one on the other on one of the surfaces of the color combining optical device intersecting the plurality of light-incident surfaces. The fluid feed-in section is fitted to the other one of the surfaces of the color combining optical device intersecting the plurality of light-incident surfaces. With this arrangement, the plurality of optical modulators, the plurality of optical modulator holders, the optical fluid circulating members, the fluid branching section, the fluid feed-in section, and the fluid pressurizing/feeding section constituting the optical device can be arranged compactly around the color combining optical device. Thus, if an optical device according to the present invention includes a plurality of optical modulators, it can be downsized so as to be handled conveniently.

The fluid branching section and the fluid pressurizing/feeding section can temporarily store cooling fluid in the inside. In other words, the fluid branching section and the fluid pressurizing/feeding section can operate as a tank. Therefore, it is possible to secure a sufficient capacity for storing cooling fluid without providing an additionally member that operate as a tank so that the optical device can be downsized.

Additionally, since the optical device has a fluid pressurizing/feeding section, it is possible to reliably cause cooling fluid to flow out from the inside of the cooling chambers to the outside through a plurality of fluid circulating members and flow into the inside of the cooling chambers from the outside through a plurality of fluid circulating members in order to replace the cooling fluid in the cooling chambers. Thus, it is possible to avoid a situation where cooling fluid warmed by the optical modulators remains in the cooling chambers for a long time and maintain the temperature difference between the optical modulators and the cooling fluid trying to cool them so as to efficiently cool the optical modulators by cooling fluid.

Additionally, since the fluid branching section and the fluid pressurizing/feeding section are arranged respectively at the upstream side and at the downstream side of each of the cooling chambers, it is possible to accelerate the rate of convection of cooling fluid flowing in each of the cooling chambers and maintain the temperature difference between the optical modulators and the cooling fluid trying to cool them so as to further efficiently cool the optical modulators by cooling fluid.

Thus, it is possible to highly efficiently cool the optical modulators by cooling fluid and, if an optical device according to the present invention has a plurality of optical modulators, it can be downsized so as to be handled conveniently.

Preferably, in an optical device according to the present invention, the fluid branching section is fitted to the one of the surfaces of the color combining optical device.

Thus, according to the present invention, since the fluid branching section and the fluid pressurizing/feeding section are laid one on the other and the fluid branching section is arranged closer to the color combining optical device, the flow path of cooling fluid between the fluid branching section and each of the optical modulator holders that are fitted to the respective light-incident surfaces of the color combining optical device can be minimized and hence the cooling fluid that is divided and fed out from the fluid branching section can smoothly flow into the cooling chambers of the optical modulator holders.

Preferably, in the optical device according to the present invention, the fluid pressurizing/feeding section is fitted to the one of the surfaces of the color combining optical device.

Thus, according to the present invention, since the fluid branching section and the fluid pressurizing/feeding section are laid one on the other and the fluid pressurizing/feeding section is arranged closer to the color combining optical device, the fluid pressurizing/feeding section and the fluid branching section may be integrally combined and the fluid branching section may be made to operate as supporting member for supporting the color combining optical device. Then, the optical components of the optical device can be contained in an optical component casing and arranged at predetermined respective positions in the optical component casing and the fluid branching section can be fitted to the bottom surface of the optical component casing so that all the optical device may be contained in the inside of the optical component casing. Then, the optical device can be handled further conveniently.

Preferably, the optical device according to the present invention further includes a heat discharging section arranged on the flow path of cooling fluid formed by arranging the plurality of fluid circulating members from the fluid feed-in section to the fluid pressurizing/feeding section in order to discharge heat from the cooling fluid.

The heat discharging section may be realized by a so-called radiator having a plurality of heat discharging fins connected to the cooling fluid flowing through the plurality of fluid circulating members so as to be able to transmit heat from the cooling fluid to the heat discharging fins. However, the heat discharging section is not limited to a radiator and a Peltier module connected to the cooling fluid flowing through the plurality of fluid circulating members so as to be able to transmit heat from the cooling fluid and utilize the Peltier effect.

Thus, according to the present invention, since the optical device includes a heat discharging section, it is possible to cool the cooling fluid flowing from the fluid feed-in section to the fluid pressurizing/feeding section and hence lower the temperature of the cooling fluid stored in the fluid branching section. Therefore, it is possible to further efficiently cool the optical modulators by the cooled cooling fluid flowing from the fluid branching section to the optical modulator holders.

Preferably, in the optical device according to the present invention, the fluid branching section and the fluid pressurizing/feeding section are made of a thermally conductive material and connected to each other so as to be able to transmit heat to each other.

Thus, according to the present invention, since the fluid branching section and the fluid pressurizing/feeding section are made of a thermally conductive material and connected to each other so as to be able to transmit heat to each other, it is possible to discharge heat from the cooling fluid in the fluid branching section and the fluid pressurizing/feeding section to the walls of the fluid branching section and the fluid pressurizing/feeding section. If the optical component casing for containing optical components and arranging them at predetermined respective positions is also made of a thermally conductive material and, after containing the optical device in the optical component casing, at least either the fluid branching section or the fluid pressurizing/feeding section is connected to the optical component casing so as to be able to transmit heat to the casing, it is possible to discharge, if partly, the heat transmitted to the walls of the fluid branching section and the fluid pressurizing/feeding section further to the optical component casing.

Preferably, the optical device according to the present invention further comprises a plurality of reflection type polarizers fitted to the respective light-incident surfaces of the color combining optical device and adapted to transmit the light beams emitted from the plurality of optical modulators and having a predetermined axis of polarization and reflect the light beams emitted from the plurality of optical modulators and having an axis of polarization other than the predetermined axis of polarization; in which the reflection type polarizers reflects the light beams having an axis of polarization other than the predetermined axis of polarization in a direction avoiding the image forming regions of the optical modulators.

Here, as the reflection type polarizers, reflection type polarizers made of an organic material or those made of an inorganic material can be exemplified.

Thus, according to the present invention, since the reflection type polarizers reflect light beams having an axis of polarization other than the predetermined axis of polarization, they hardly generate heat if compared with absorption type polarizers that absorb light beams having an axis of polarization other than the predetermined axis of polarization so that it is possible to keep the reflection type polarizers to a relatively low temperature level. As a result, unlike conventional optical device in which it is necessary to keep not only optical modulators but also polarization plates in contact with cooling fluid flowing from cooling chambers, it is no longer necessary for an optical device according to the present invention to have such a structure where not only optical modulators but also polarization plates have to be held by optical modulator holders. Thus, the temperature of the cooling fluid contained in the cooling chambers of the optical modulator holders is not raised by the polarization plates and hence it is possible to efficiently cool the optical modulators.

Additionally, since reflection type polarizers are adapted to reflect the light beams having an axis of polarization other than the predetermined axis of polarization in a direction avoiding the image forming regions of the optical modulators, no straying light is generated in the optical device so that the optical images formed by the optical modulators can be stably maintained to consequently produce a fine optical image.

Preferably, in the optical device according to the present invention, each of the reflection type polarizers is formed by a plurality of prisms that are connected to each other and a reflection type polarization film arranged between the plurality of prisms and adapted to transmit the light beams, which are emitted from the corresponding optical modulator, having a predetermined axis of polarization and reflect the light beams having an axis of polarization other than the predetermined axis of polarization; and the plurality of prisms of each of the reflection type polarizers include an incident-side prism having a light-incident surface that is arranged at the light-incident side and operates both as a transmission surface for the light beams emitted from the optical modulator and as a total reflection surface for the light beams reflected by the reflection type polarization film; the incident-side prism being adapted to reflect the light beams reflected by the reflection type polarization film at the total reflection surface and emit them in a direction avoiding the image forming regions of the optical modulators.

Thus, according to the present invention, each of the reflection type polarizers has a plurality of prisms and a reflection type polarization film. The incident-side prism of the plurality of prisms reflects the light beams reflected by the reflection type polarization film at the total reflection plane and emits them in a direction avoiding the image forming regions of the optical modulators so that it is possible to avoid a situation where straying light is generated in the optical device by means of a simple arrangement.

A projector according to the present invention has a light source, the optical device described above and a projection optical device for enlarging and projecting the optical image formed by the optical device.

Thus, the projector according to the present invention has the light source, the optical device described above and an projection optical device and hence provides the effects and the advantages of the optical device.

Additionally, since the projector has the optical device that can efficiently cool its optical modulators, it is possible to prevent thermal degradation of the optical modulators and prolong the service life of the projector.

Preferably, the projector according to the present invention further has an optical component casing made of a thermally conductive material for containing the optical device at a predetermined position relative to the projection optical device; and at least either the fluid branching section or the fluid pressurizing/feeding section is made of a thermally conductive material and, when the optical device is contained in the optical component casing, connected to the optical component casing so as to be able to transmit heat thereto.

Thus, the projector according to the present invention further has the optical component casing made of a thermally conductive material. Additionally, at least either the fluid branching section or the fluid pressurizing/feeding section is made of a thermally conductive material. When the optical device is contained in the optical component casing, at least either the fluid branching section or the fluid pressurizing/feeding section is connected to the optical component casing so as to be able to transmit heat to it. With this arrangement, it is possible to secure a thermal conduction route of the circulating cooling fluid—at least either the fluid branching section or the fluid pressurizing/feeding section—the optical component casing, and improve the cooling efficiency of cooling fluid. As a result, the optical component casing is made to operate as radiator so that a projector according to the present invention can satisfactorily improve the cooling efficiency of cooling fluid without additionally arranging a separate member that operates as radiator.

BRIEF DESCRIPTION OF THE DRAWINGS

FIG. 4 is a schematic illustration of the structure of one of irradiation-side polarizators of the first embodiment;

FIG. 9 is a cross sectional view of the first embodiment, illustrating the cooling structure of a liquid crystal panel thereof;

DETAILED DESCRIPTION OF THE PREFERRED EMBODIMENTS

1st Embodiment

Now, the first embodiment of the present invention will be described by referring to the accompanying drawings.

[Configuration of Projector]

Figure 1:
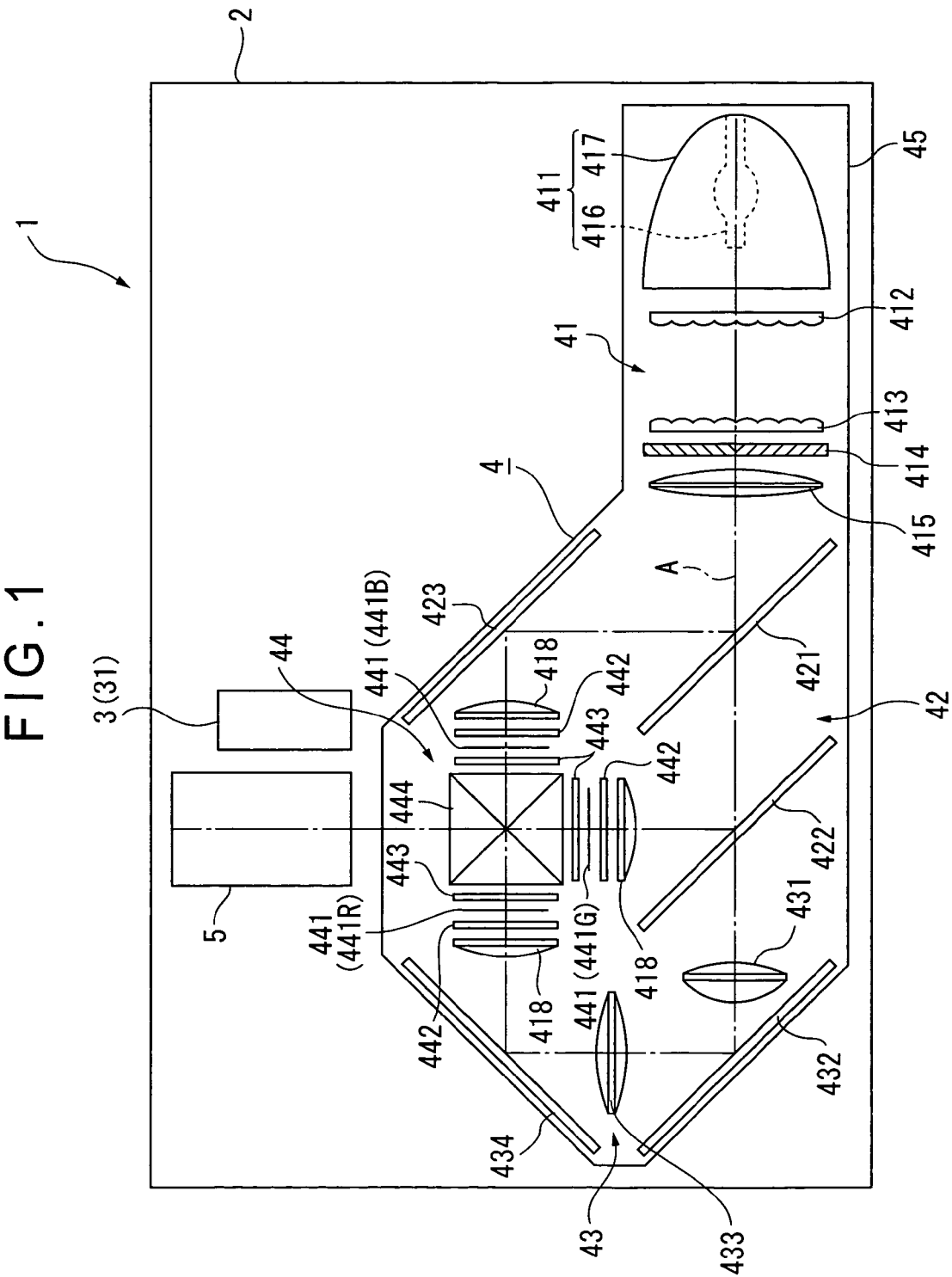
FIG. 1 is a schematic illustration of a first embodiment of projector according to the present invention, showing the configuration thereof.

FIG. 1 is a schematic illustration showing the configuration of a projector 1.

The projector 1 forms an optical image, modulating the light beam emitted from a light source according to image information supplied to it, and project the formed optical image onto a screen, enlarging the image. The projector 1 includes an external case 2, a cooling unit 3, an optical unit 4 and a projection lens 5 that is a projection optical device.

Although not shown in FIG. 1, a power supply block, a lamp drive circuit and other components are arranged in the space in the external case 2 in addition to the cooling unit 3, the optical unit 4 and the projection lens 5.

The external case 2 is typically made of synthetic resin and has a substantially cubic profile so as to contain the cooling unit 3, the optical unit 4 and the projection lens 5 arranged therein. Although not shown, the external case 2 includes an upper case that defines the top surface, the front surface, the rear surface and the lateral surfaces of the projector 1 and a lower case that defines the bottom surface, the front surface, the rear surface and the lateral surfaces of the projector 1. The upper case and the lower case are rigidly secured to each other typically by means of screws.

Note that the external case 2 may not necessarily be made of synthetic resin. Alternatively, it may be made of some other material such as metal.

Although not shown, the external case 2 is provided with an air inlet port for introducing cooling air from the outside to the inside of the projector 1 by the cooling unit 3 and an exhaust port for expelling warm air warmed in the inside of the projector 1.

The cooling unit 3 feeds cooling air into the cooling flow path formed in the inside of the projector 1 to cool down the heat generated in the projector 1. The cooling unit 3 is located at a side of the projection lens 5 and includes a sirocco fan 31 for introducing cooling air from the outside of the projector 1 through the air inlet port formed in the external case 2 (not shown) and blow it onto the liquid crystal panels of the optical device of the optical unit 4, which will be described hereinafter.

Although not shown, the cooling unit 3 includes a light source of the optical unit 4, which will be described hereinafter, and a cooling fan for cooling the power supply block, the lamp drive circuit, etc. (not shown) in addition to the sirocco fan 31.

The optical unit 4 is an unit adapted to optically process the light beams emitted from the light source and form an optical image (color image) that corresponds to the image information supplied to it. As shown in FIG. 1, the optical unit 4 extends along the rear surface of the external case 2 and shows a substantially L-shaped contour extending along a lateral surface of the external case 2 in plan view. The configuration of the optical unit 4 will be described in detail hereinafter.

The projection lens 5 is as a matter of fact a combination of a plurality of lenses. The projection lens 5 enlarges the optical image (color image) formed by the optical unit 4 and projects it onto a screen (not shown).

[Detailed Configuration of Optical Unit]

As shown in FIG. 1, the optical unit 4 includes an integrator illuminating optical system 41, a color separating optical system 42, a relay optical system 43, an optical device 44 and an optical component casing 45 for containing the optical components 41 through 44 that are arranged therein.

The integrator illuminating optical system 41 is an optical system for substantially uniformly illuminating the image forming region of the liquid crystal panels of the optical device 44, which will be described in detail hereinafter. As shown in FIG. 1, the integrator illuminating optical system 41 includes a light source 411, a first lens array 412, a second lens array 413, a polarization converter 414 and a superimposing lens 415.

The light source 411 by turn includes a light source lamp 416 that emits a radial beam of light and a reflector 417 for reflecting light emitted from the light source lamp 416. The light source lamp 416 may typically be a halogen lamp, a metal halide lamp or a high-pressure mercury lamp. While the reflector 417 shown in FIG. 1 is a paraboloid mirror, the present invention is by no means limited thereto and an ellipsoidal mirror may alternatively be used for the reflector 417 with a parallelizing convex lens for turning the beam of light reflected by the ellipsoidal mirror into a parallel beam of light.

The first lens array 412 has a structure formed by arranging small lenses, each showing a substantially rectangular contour as viewed in the direction of the optical axis, into a matrix. Each of the small lenses is adapted to divide the light beam emitted from the light source 411 and striking it into a plurality of partial light beams.

The second lens array 413 has a structure also formed by arranging small lenses into a matrix, which is substantially same as that of the first lens array 412. With the supporting lens, the second lens array 413 is adapted to form an image of each small lens of the first lens array 412 on the liquid crystal panels of the optical device 44, which will be described in detail hereinafter.

The polarization converter 414 is arranged between the second lens array 413 and the superimposing lens 415 and adapted to convert the partial light beams from the second lens array 413 into polarized light of a substantially single type.

More specifically, the partial light beams converted by the polarization converter 414 into polarized light of a substantially single type are eventually substantially superimposed one on the other on the liquid crystal panels of the optical device 44 by the superimposing lens 415. A projector using liquid crystal panels of the type adapted to modulate polarized light can utilize polarized light of only a single type. In other words, such a projector cannot utilize about a half of light emitted from a light source 411 that randomly emits polarized light. Therefore, this embodiment is adapted to raise the efficiency of utilizing light in the optical device 44 by converting light beams emitted from the light source 411 into polarized light of substantially a single type by using the polarization converter 414.

As shown in FIG. 1, the color separating optical system 42 includes a pair of dichroic mirrors 421, 422 and a reflection mirror 423 and has a function of separating the plurality of partial light beams emitted from the integrator illuminating optical system 41 into lights of three colors of red, green and blue by the dichroic mirrors 421, 422.

As shown in FIG. 1, the relay optical system 43 includes an incident-side lens 431, a relay lens 433 and reflection mirrors 432, 434 and has a function of leading red light separated by the color separating optical system 42 to the liquid crystal panel for red color of the optical device 44, which will be described in detail hereinafter.

At the same time, the dichroic mirror 421 of the color separating optical system 42 reflects the blue light components and transmits the red light components and the green light components of light beams emitted from the integrator illuminating optical system 41. Blue light reflected by the dichroic mirror 421 is then reflected by the reflection mirror 423 and passes through the field lens 418 to get to the liquid crystal panel for blue light of the optical device 44, which will be described in detail hereinafter. The field lens 418 converts the partial light beams emitted from the second lens array 413 into light beams running in parallel with the central axis (main light beam) thereof. The above description also apples to the field lens 418 arranged at the light incident-side of the liquid crystal panel for green light and the field lens 418 arranged at the light incident-side of the liquid crystal panel for red light.

Of red light and green light transmitted through, the dichroic mirror 421, green light is reflected by the dichroic mirror 422 and passes through the field lens 418 to get to the liquid crystal panel for green light of the optical device 44, which will be described in detail hereinafter. Similarly, red light is transmitted through the dichroic mirror 422 and passes through the relay optical system 43 and then through the field lens 418 to get to the liquid crystal panel for red light of the optical device 44, which will be described in detail hereinafter. The relay optical system 43 is provided for red light in order to prevent any reduction of the efficiency of utilization of light due to dispersion of light because the light path for red light is longer than the light paths of lights of the other colors. In other words, it is provided in order to transmit the entire incident partial light beams entering the incident-side lens 431 to the field lens 418. While the light path for red light is made long in this embodiment, the light path for blue light, for example, may alternatively be made long for the purpose of the present invention.

As shown in FIG. 1, the optical device 44 includes three liquid crystal panels 441 (liquid crystal panel 441R for red light, liquid crystal panel 441G for green light, liquid crystal panel 441B for blue light) that operate as optical modulators, incident-side polarization plates 442 and irradiation-side polarizers 443 arranged respectively at the light-incident sides and the light-irradiation sides of the liquid crystal panels 441 and a cross dichroic prism 444 that operates as color combining optical device. The three liquid crystal panels 441, the three irradiation-side polarizers 443 and the cross dichroic prism 444 are integrally formed. While the three incident-side polarization plates 442 are provided separately from the three liquid crystal panels 441, the three irradiation-side polarizers 443 and the cross dichroic prism 444 in this embodiment, they may also be integrally formed with the other components.

While the specific configuration of the optical device 44 is described in detail hereinafter, it also has a fluid pressurizing/feeding section, fluid circulating members, a fluid branching section, an optical modulator holder, a support member and a fluid feed-in section in addition to the liquid crystal panels 441, the irradiation-side polarizers 443 and the cross dichroic prism 444.

The incident-side polarization plates 442 are adapted to receive respective lights of the three colors that are polarized substantially to one direction by the polarization converter 414 and transmit only beams of light polarized substantially in the direction same as the direction of the axis of polarization of the light beams produced from the polarization converter 414 while it absorbs other light beams. Although not shown specifically, each of the incident-side polarization plates 442 is formed by applying a polarization film to a light-transmitting substrate of sapphire glass, quartz or the like.

The optical component casing 45 is typically formed by using metal members and, as shown in FIG. 1, a predetermined illumination optical axis A is defined in the inside. It contains the above-described optical components 41 through 44 that are arranged at predetermined respective positions relative to the illumination optical axis A. Note, however, the optical component casing 45 does not necessarily have to be formed by using metal members and may alternatively be formed by using members of some other material, although the material is preferably thermally conductive. Although not shown specifically, the optical component casing 45 is formed by using a container-like component containing member for containing the optical components 41 through 44 and a closure member for closing the aperture of the component containing member.

Of the above listed members, the component containing member defines the bottom surface, the front surface and the lateral surfaces of the optical component casing 45.

The component containing member is provided at the bottom surface thereof with three holes (not shown) arranged at respective positions that correspond to the liquid crystal panels 441 of the optical device 44. Cooling air introduced into the inside of the projector 1 from the outside thereof by the sirocco fan 31 of the cooling unit 3 is ejected from the sirocco fan 31 and forced to flow to the three liquid crystal panels 441 of the optical device 44 through the above-described three holes.

[Configuration of Optical Device]

Figure 2:
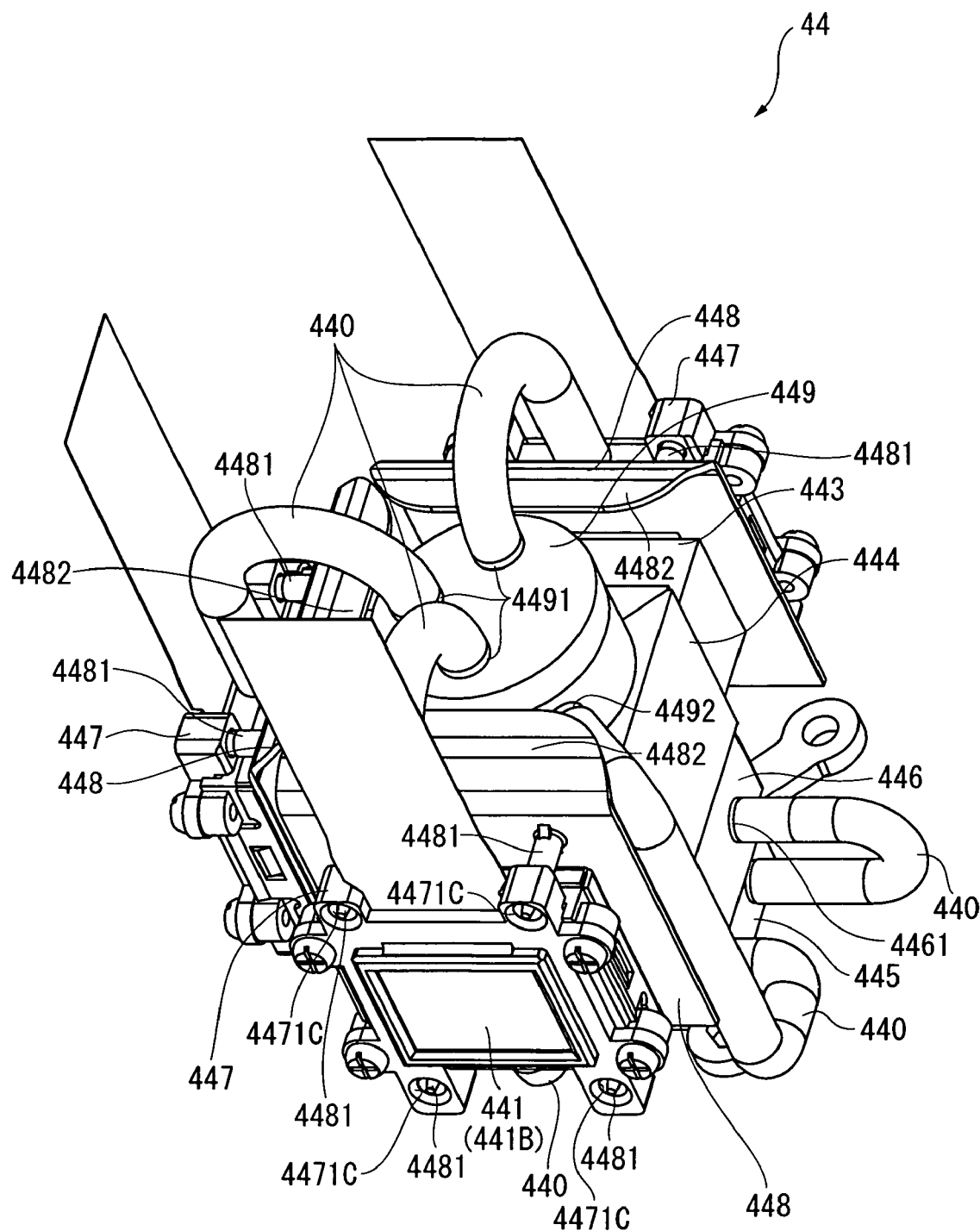
FIG. 2 is a schematic perspective view of an optical device of the first embodiment.
Figure 3:
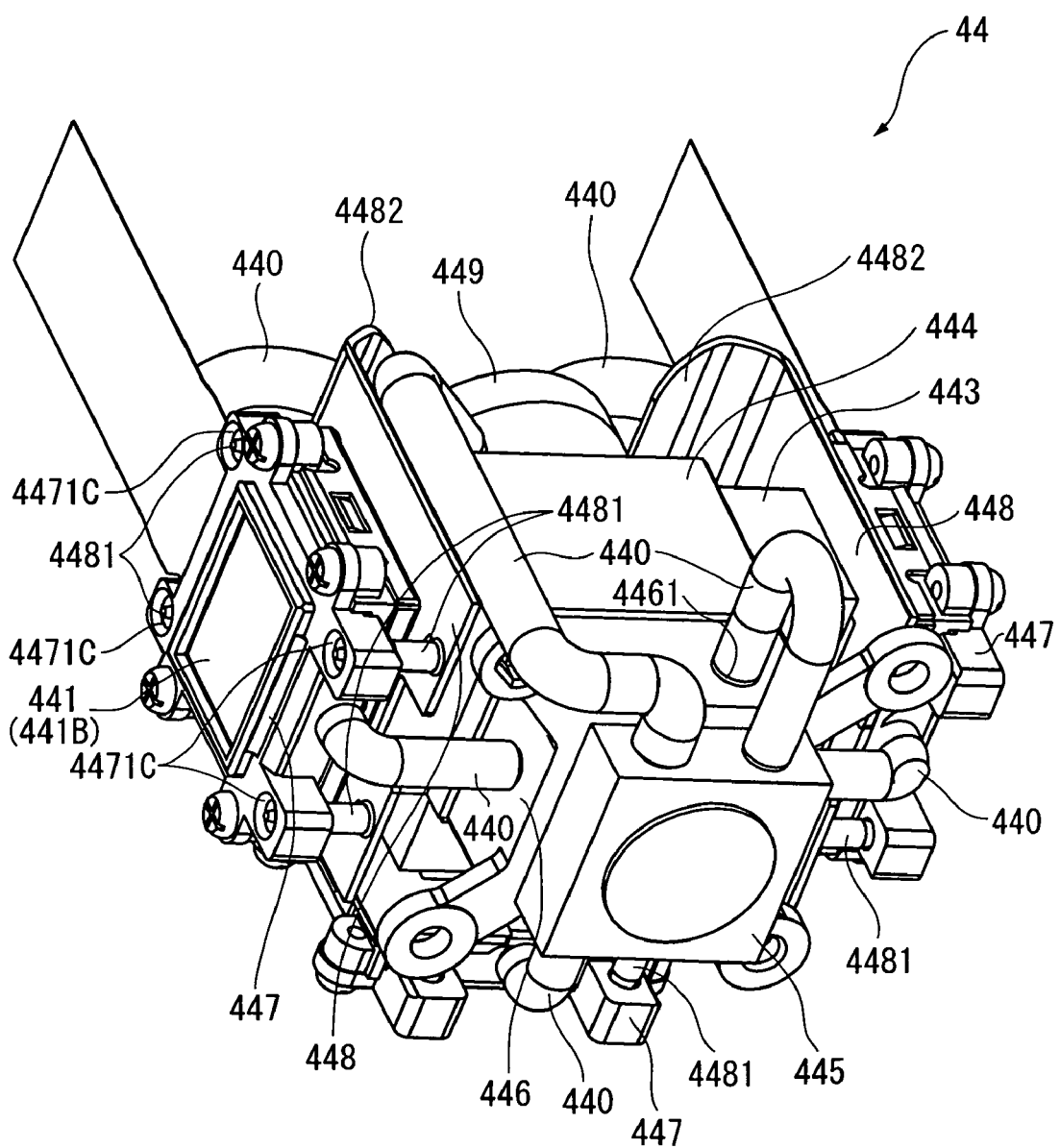
FIG. 3 is another schematic perspective view of the optical device of the first embodiment.

FIGS. 2 and 3 schematically illustrate the configuration of the optical device 44. More specifically, FIG. 2 is a schematic perspective view of the optical device 44 as viewed from above. FIG. 3 is a schematic perspective view of the optical device 44 as viewed from below.

As shown in FIGS. 2 and 3, the optical device 44 has three liquid crystal panels 441, three irradiation-side polarizers 443, a cross dichroic prism 444, a fluid pressurizing/feeding section 445, a fluid branching section 446, optical modulator holders 447, a support member 448, a fluid feed-in section 449 and a plurality of fluid circulating members 440.

[Structure of Liquid Crystal Panel]

Figure 6:
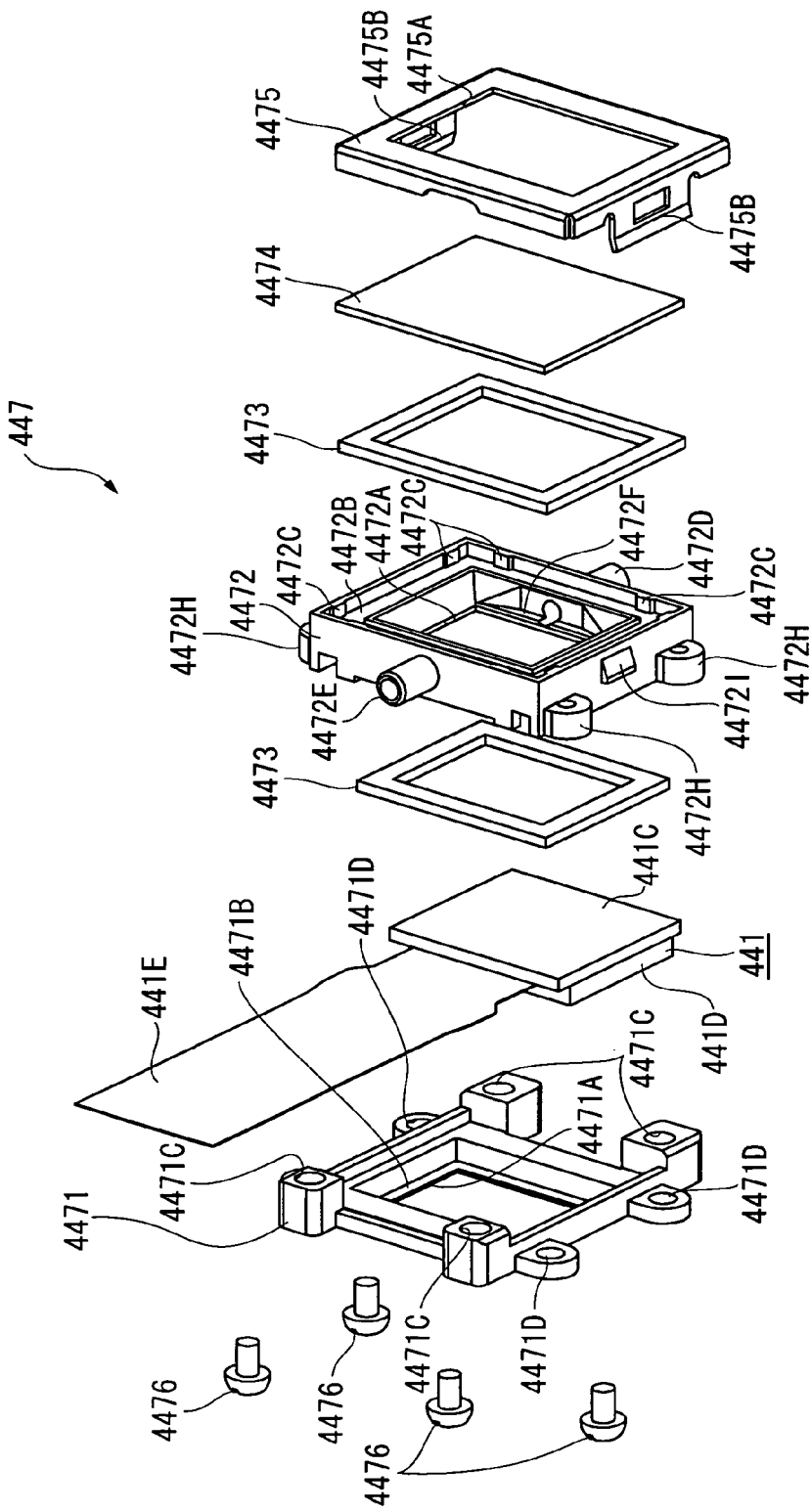
FIG. 6 is an exploded schematic perspective view of one of optical modulator holders of the first embodiment.

As shown in FIG. 6, each of the liquid crystal panels 441 comprises a pair of substrates 441C, 441D and liquid crystal, which is an electro-optical material, contained between the pair of substrates in a hermetically sealed state. Of the paired substrates 441C, 441D, the substrate 441C is a drive substrate for driving the liquid crystal and has a plurality of data lines arranged in parallel with each other, a plurality of scanning lines arranged in a direction perpendicular to the plurality of data lines, pixel electrodes arranged at the respective intersections of the scanning lines and the data lines to form a matrix and switching elements such as TFTs. The substrate 441D is an opposite substrate arranged vis-à-vis the substrate 441C with a predetermined gap separating them from each other. It carries a common electrode to which a predetermined voltage Vcom is applied. The substrates 441C, 441D are connected to a flexible printed circuit board 441E that is electrically connected to a control device (not shown) and adapted to output predetermined drive signals to the scanning lines, the data lines, the switching elements, the common electrode and so on. A voltage is applied between the pixel electrodes and the common electrode and the orientation of the liquid crystal interposed between the pixel electrodes and the common electrode is controlled so as to modulate the direction of polarization of the polarized light beams emitted from the incident-side polarization plates 442 as a drive signal is input from the control device by way of the flexible printed circuit board 441E.

[Structure of Irradiation-Side Polarizer]

FIG. 4 is a schematic illustration of the structure of one of the irradiation-side polarizers 443 of the first embodiment. More specifically, it shows a lateral view of the irradiation-side polarizer 443.

The irradiation-side polarizer 443 is a reflection type polarizer that transmits only light beams having an axis of polarization perpendicular to the axis of transmission of light beams of the corresponding incident-side polarization plate 442 and reflects light beams having any other axis of polarization. The three irradiation-side polarizers 443 show a substantially cubic profile with a predetermined thickness and the light-irradiation side surface of each of them is bonded and rigidly secured to the corresponding light-incident surface of the cross dichroic prism 444.

As shown in FIG. 4, the irradiation-side polarizer 443 includes a pair of rectangular prism 443A and a reflection type polarization film 443B formed along the interface of the rectangular prisms 443A. A multilayer film prepared by laying a large number of films that are formed by drawing a polymeric material, for example, may be employed for the reflection type polarization film 443B.

Of the light beams L that enter the irradiation-side polarizer 443, the light beams L1 having a predetermined axis of polarization are transmitted through the reflection type polarization film 443B and enter the cross dichroic prism 444, as shown in FIG. 4.

On the other hand, out of the light beams L that enter the irradiation-side polarizer 443, the light beams L2 having any other axis of polarization are reflected by the reflection type polarization film 443B and then totally reflected by the light-incident surface of the rectangular prism 443A so as to irradiate upward.

[Structure of Cross Dichroic Prism]

As shown in FIG. 1, the cross dichroic prism 444 is an optical element adapted to combine the optical images emitted from the respective irradiation-side polarizers 443 and modulated for three color lights to form a color image. The cross dichroic prism 444 is formed by bonding four rectangular prisms so as to show a substantially square contour in plan view and a pair of dielectric multilayer films are formed along the interfaces of the rectangular prisms that are bonded together. The dielectric multilayer films reflect color lights emitted from the liquid crystal panels 441R, 441B and getting to them through the related irradiation-side polarizers 443 and transmit color light emitted from the liquid crystal panel 441G and getting to them through the related irradiation-side polarizer 443. In this way, color lights modulated respectively by the liquid crystal panels 441R, 441G, 441B are combined to form a color image.

[Structure of Fluid Circulating Member]

As shown in FIG. 3, the plurality of fluid circulating members 440 are formed by using an aluminum-made tubular member so as to allow cooling fluid to transfer heat by convection and connect the members 445 through 447 and 449 so as to allow cooling fluid to circulate. Thus, they cool down the heat generated in the liquid crystal panels 441 by way of circulating fluid.

In this embodiment, ethylene glycol that is transparent and nonvolatile liquid is used as cooling fluid. However, liquid other than ethylene glycol may alternatively be used as cooling fluid for the purpose of the present invention.

[Structure of Liquid Pressurizing/Feeding Member]

The fluid pressurizing/feeding section 445 feeds in cooling fluid from the outside and forcibly sends out the fed in cooling fluid to the outside. For this purpose, the fluid pressurizing/feeding section 445 is connected to an end of each of the two fluid circulating members 440 and held in communication with the fluid circulating members 440, as shown in FIG. 2 or 3.

Although not shown specifically, the fluid pressurizing/feeding section 445 includes a substantially cubic aluminum-made hollow member and an impeller contained in the hollow member and is adapted to forcibly feed in cooling fluid from the outside through the fluid circulating members 440 and send out the fed in cooling fluid to the outside through the fluid circulating members 440 by driving the impeller to revolve under the control of a control device (not shown). With this arrangement, it is possible to reduce the thickness of the impeller in the fluid pressurizing/feeding section 445 as viewed in the direction of its rotary axis. Then, consequently, the fluid pressurizing/feeding section 445 can be arranged in the remaining space of the inside of the projector 1. In this embodiment, the fluid pressurizing/feeding section 445 is arranged below the cross dichroic prism 444 in this embodiment, although the positional arrangement will be described in greater detail hereinafter.

[Structure of Fluid Branching Section]

Figure 5A:
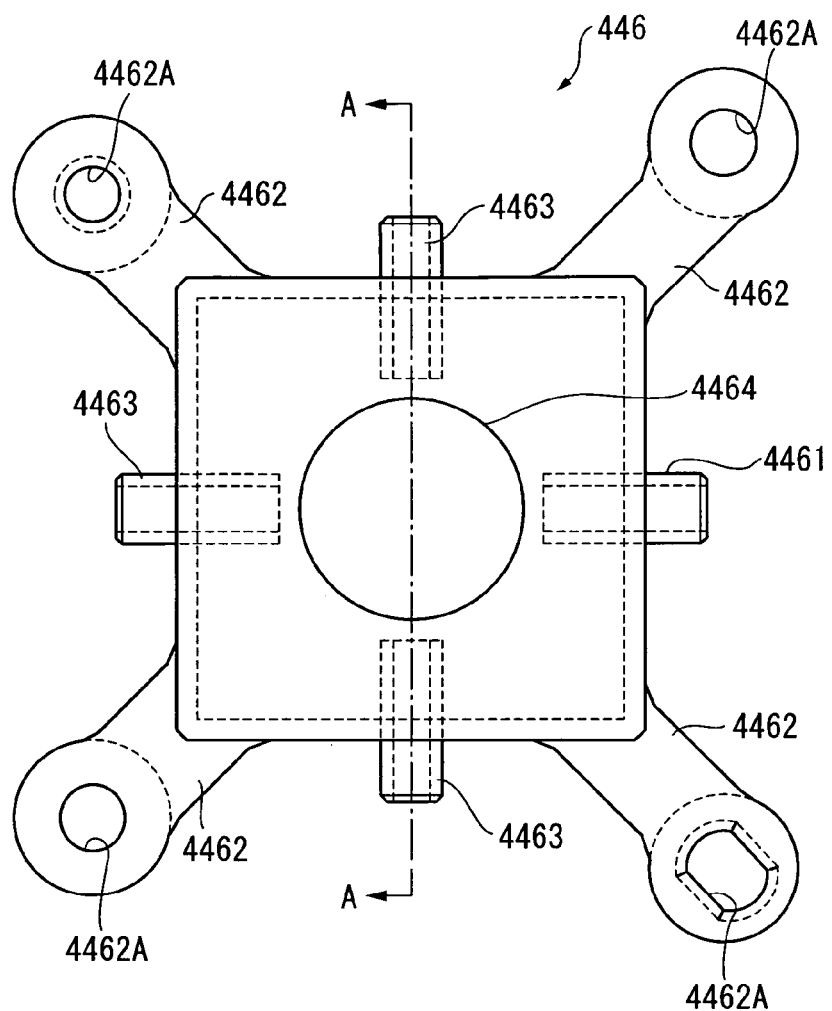
FIG. 5A is a schematic plan view of a fluid branching section of the first embodiment.
Figure 5B:
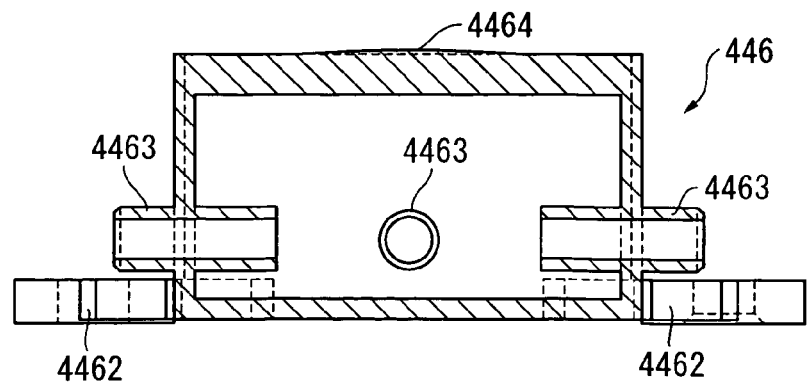
FIG. 5B is a cross sectional view taken along line A—A in FIG. 5A.

FIGS. 5A and 5B schematically illustrate the structure of the fluid branching section 446. More specifically, FIG. 5A is a schematic plan view of the fluid branching section 446. FIG. 5B is a cross sectional view taken along line A—A in FIG. 5A.

The fluid branching section 446 is formed by using an aluminum-made hollow and substantially cubic member and adapted to branch cooling fluid that is fed into and forcibly sent out from the fluid pressurizing/feeding section 445 into three flows and feed it into the three optical modulator holders 447. The fluid branching section 446 is rigidly secured to the lower surface of the cross dichroic prism 444 that is the surface intersecting the three light beam receiving incident-side surfaces of the cross dichroic prism 444 and operates as a prism securing plate for rigidly supporting the cross dichroic prism 444.

As shown in FIGS. 5A and 5B, the surface of the fluid branching section 446 that is located vis-à-vis the light-irradiation side surface of the cross dichroic prism 444 is provided with a cooling fluid flow-in section 4461 for flowing cooling fluid that is fed in from the fluid pressurizing/feeding section 445 under pressure into the inside. The cooling fluid flow-in section 4461 is formed by using a substantially tubular member having a diameter smaller than the diameter of the fluid circulating members 440 and projecting both to the inside and to the outside of the fluid branching section 446. As shown in FIG. 2 or FIG. 3, the end of the cooling fluid flow-in section 4461 that is projecting outside is connected to the corresponding one of the opposite ends of one of the two fluid circulating members 440 that is connected to the fluid pressurizing/feeding section 445 for communication so that cooling fluid that is sent from the fluid pressurizing/feeding section 445 through the fluid circulating member 440 flows into the inside of the fluid branching section 446.

As shown in FIG. 5A, the fluid branching section 446 is provided at the four corners of the bottom surface thereof with respective arm sections 4462 that extends along the bottom surface. The arm sections 4462 are equipped at respective front end parts thereof with holes 4462A so that the optical device 44 is rigidly secured to the component containing member as screws are driven through the respective holes 4462A into the component containing member (not shown) of the optical component casing 45 (see FIG. 9). As the optical device 44 is contained in the component containing member, the fluid pressurizing/feeding section 445 and the fluid branching section 446 are laid one on the other under the lower surface of the cross dichroic prism 444 so as to pinch the component containing member between (see FIG. 9). As a result, the fluid pressurizing/feeding section 445, the fluid branching section 446 and the optical component casing 45 are connected so as to be able to transmit heat to each other.

As shown in FIG. 5A, cooling fluid flow-out sections 4463 for branching fed in cooling fluid to the three optical modulator holders 447 are arranged respectively at the three lateral surfaces of the fluid branching section 446 that correspond to surfaces of the light-incident sides of the cross dichroic prism 444.

Like the cooling fluid flow-in section 4461, each of the cooling fluid flow-out sections 4463 is formed by using a substantially tubular member having a diameter smaller than the diameter of the fluid circulating members 440 and projecting both to the inside and to the outside of the fluid branching section 446. The end of each of the cooling fluid flow-in sections 4461 that is projecting outside is connected to the corresponding one of the opposite ends of one of the two fluid circulating members 440 so that cooling fluid in the fluid branching section 446 is branched to flow out to the outside respectively through the fluid circulating members 440.

Additionally, as shown in FIGS. 5A and 5B, a round and globular protruding section 4464 is formed substantially at the center of the top surface of the fluid branching section 446. Thus, as the lower surface of the cross dichroic prism 444 is brought to abut the protruding section 4464, it becomes possible to regulate the upward angular position of the cross dichroic prism 444 relative to the fluid branching section 446.

[Structure of Optical Modulator Holder]

FIG. 6 is an exploded schematic perspective view of one of the optical modulator holders 447.

The three optical modulator holders 447 respectively hold the three liquid crystal panels 441 and are adapted to allow cooling fluid to flow into and out of the insides thereof in order to cool the three liquid crystal panels 441 by means of cooling fluid. The optical modulator holders 447 have the same and identical configuration and hence only one of the optical modulator holders 447 will be described below.

The optical modulator holder 447 has a pair of frame members 4471, 4472, two resilient members 4473, a light transmitting substrate 4474 and a light transmitting substrate fixing member 4475.

The frame member 4471 is a frame body showing a substantially rectangular contour in plan view with a rectangular aperture 4471A formed substantially at a central position thereof that corresponds to the image forming region of the corresponding liquid crystal panel 441 and arranged at the light-incident side relative to the frame member 4472. It is adapted to press and rigidly hold the liquid crystal panel 441 relative to the frame body from the light-incident side through the resilient members 4473.

As shown in FIG. 6, a supporting surface 4471B is formed at the light-irradiation side of the frame member 4471 so as to support the corresponding light-incident surface of the liquid crystal panel 441.

Additionally, as shown in FIG. 6, four insertion sections 4471C are formed respectively at the four corners of the frame member 4471 so as to extend from the upside to the downside thereof and allow pin-shaped members of the support member 448 to pass through them.

Still additionally, also as shown in FIG. 6, four connecting sections 4471D are formed respectively near the four corners of the frame member 4471, two at the left side and two at the right side, to connect the frame member 4471 to the frame member 4472.

Figure 7:
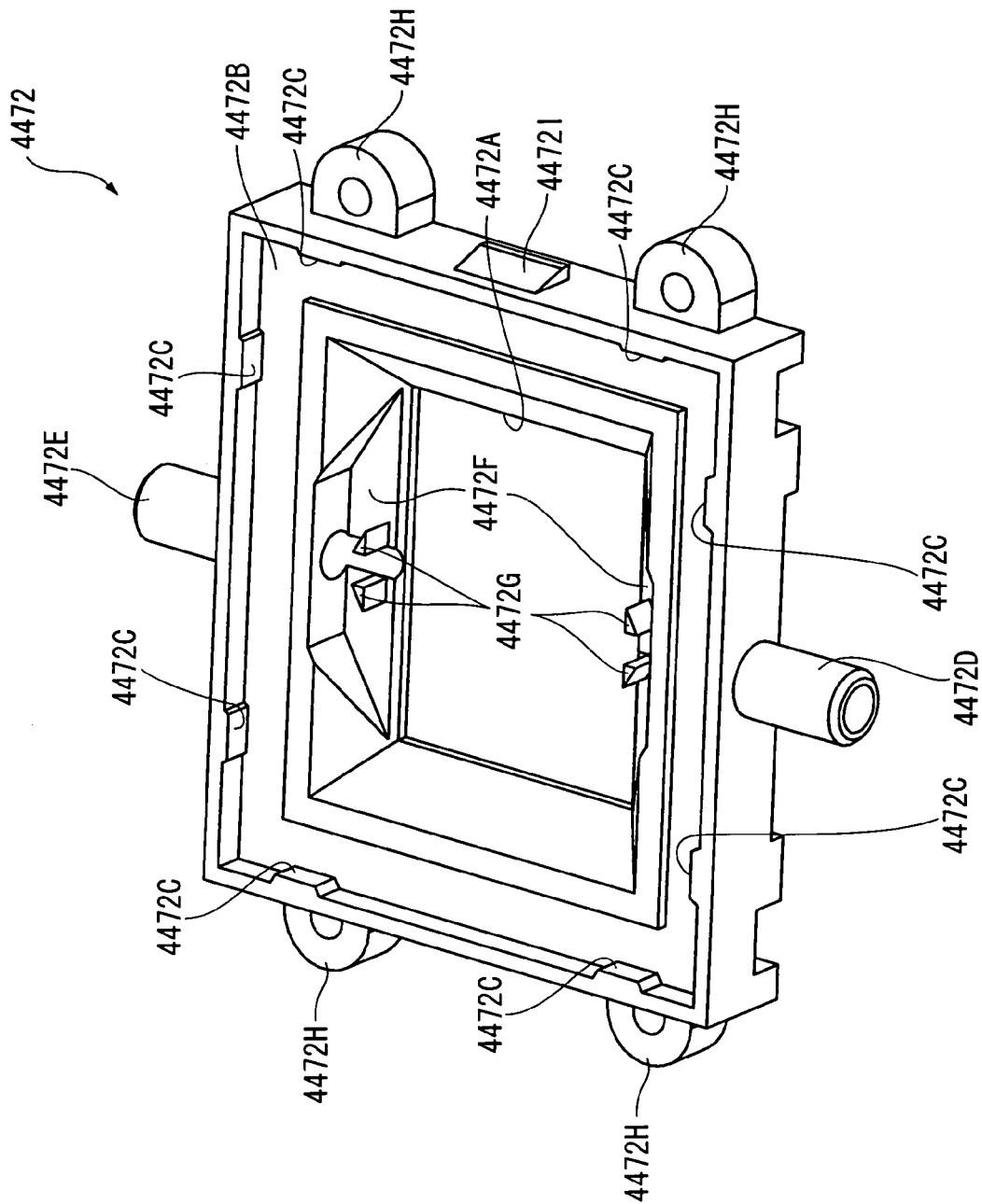
FIG. 7 is a schematic perspective view of a frame member of the first embodiment as viewed from the light-irradiation side thereof.

FIG. 7 is a schematic perspective view of the frame member 4472 as viewed from the light-irradiation side thereof.

The frame member 4472 is an aluminum-made frame body showing a substantially rectangular contour in plan view with a rectangular aperture 4472A formed substantially at a central position thereof that corresponds to the image forming region of the corresponding liquid crystal panel 441. It is adapted to pinch the liquid crystal panel 441 between itself and the frame member 4471 through one of the resilient members 4473 and support the light transmitting substrate 4474 at the side opposite to the side located vis-à-vis the frame member 4471 through the other resilient member 4473.

As shown in FIG. 7, a rectangular frame-shaped recess 4472B is formed at the light-irradiation side of the frame member 4472 and the contour of the recess 4472B corresponds to that of the resilient member 4473 so that the light transmitting substrate 4474 is supported in the recess 4472B through the corresponding resilient member 4473. As the frame member 4472 supports the light transmitting substrate 4474, the aperture 4472A is closed by the corresponding resilient member 4473 and the light-incident side of the light transmitting substrate 4474 at the light-irradiation side thereof. A plurality of anchoring projections 4472C is formed on the outer peripheral surface of the recess 4472B. The peripheral surface of the resilient member 4473 abuts the anchoring projections 4472C to hold the resilient member 4473 in position in the recess 4472B.

Although not shown, a recess similar to the recess 4472B formed at the light-irradiation side of the frame member 4472 is also formed at the light-incident side of the frame member 4472 so that the light-irradiation side of the liquid crystal panel 441 is supported in the recess through the corresponding resilient member 4473. As the frame member 4472 supports the liquid crystal panel 441 at the light-irradiation side of the panel 441, the aperture 4472A is closed by the corresponding resilient member 4473 and the light-irradiation side of the liquid crystal panel 441 at the light-incident side thereof. Although not shown, a plurality of anchoring projections similar to the anchoring projections 4472C formed on the inner peripheral surface of the frame member 4472 at the light-irradiation side are also formed on the inner peripheral surface of the frame member 4472 at the light-incident side thereof.

As the aperture 4472A is closed both at the light-incident side and at the light-irradiation side respectively by the liquid crystal panel 441 and the light transmitting substrate 4474, a cooling chamber R1 (see FIG. 9) that can receive cooling fluid and hold it in a hermetically sealed state is formed in the inside of the frame member 4472.

Additionally, a flow-in port 4472D for allowing cooling fluid flowing out from the corresponding one of the cooling fluid flow-out sections 4463 of the fluid branching section 446 to flow into the inside is formed substantially at the center of the lower side of the frame member 4472 as shown in FIG. 7. The flow-in port 4472D is formed by using a tubular member having a diameter smaller than the diameter of the fluid circulating members 440 and projects to the outside of the frame member 4472. The projecting outermost end of the flow-in port 4472D is connected to one of the opposite ends of the corresponding fluid circulating member 440 that is connected to the corresponding cooling fluid flow-out section 4463 of the fluid branching section 446 at the other end thereof so that cooling fluid flowing out of the fluid branching section 446 through the corresponding fluid circulating member 440 flows into the cooling chamber R1 (see FIG. 9).

Still additionally, as shown in FIG. 7, a flow-out port 4472E for allowing cooling fluid from the inside of the cooling chamber R1 (see FIG. 9) of the frame member 4472 to the outside is formed substantially at the center of the upper side of the frame member 4472. In other words, the flow-out port 4472E is formed at a position opposite to the flow-in port 4472D. Like the flow-in port 4472D, the flow-out port 4472E is formed by using a tubular member having a diameter smaller than the diameter of the fluid circulating members 440 and projects to the outside of the frame member 4472. The projecting outermost end of the flow-out port 4472E is connected to one of the opposite ends of the corresponding fluid circulating member 440 so that cooling fluid flows out from the inside of the cooling chamber R1 (see FIG. 9) to the outside through the fluid circulating member 440.

The inner periphery of the frame member 4472 facing the aperture 4472A is provided near the positions communicating with the flow-in port 4472D and the flow-out port 4472E with respective recesses 4472F that are open toward the light-incident side. The recesses 4472F are gradually narrowed toward the respective positions.

A pair of flow rectifying sections 4472G are formed on the bottom surface of each of the recesses 4472F so as to rise from the bottom surface. Each pair of flow rectifying sections 4472G show a cross section of a substantially rectangular triangle and are arranged with a predetermined gap separating them from each other, and are also arranged in such a way that the slopes of the rectangular triangles move away from the above position.

As shown in FIG. 7, connecting sections 4472H are formed respectively near the four corners of the frame member 4472, two at the left side and two at the right side, to connect the frame member 4472 to the frame member 4471.

As the connecting sections 4471D of the frame member 4471 are bound to the respective connecting sections 4472H of the frame member 4472 by means of screws 4476 (FIG. 6), the liquid crystal panel 441 is pinched between and held by the frame members 4471, 4472 through the resilient members 4473 and the aperture 4472A of the frame member 4472 is tightly closed at the light-incident side thereof.

As shown in FIG. 6 or 7, hooks 44721 are formed respectively substantially at the centers of the left side and the right side of the frame member 4472 so as to be engaged with the light transmitting substrate fixing member 4475.

The resilient members 4473 are arranged respectively between the liquid crystal panel 441 and the frame member 4472 and between the frame member 4472 and the light transmitting substrate 4474 and adapted to hermetically seal the cooling chamber R1 (see FIGS. 8A and 8B) of the frame member 4472 in order to prevent cooling fluid from leaking out. The resilient members 4473 are made of resilient silicon rubber and subjected to a surface treatment process in order to raise the cross-linking density of the surface layer at one or both of the opposite surfaces thereof. For example, the resilient members 4473 may be made of SARCON GR-d Series (trademark, available from Fujipoly). As the resilient members 4473 are subjected to a surface treatment process, the operation of arranging them in the respective recesses 4472B of the frame member 4472 is facilitated.

However, the resilient members 4473 may alternatively be made of butyl rubber or fluorocarbon rubber that hardly allows moisture to permeate.

The light transmitting substrate 4474 is formed by using a light transmitting glass substrate.

The light transmitting substrate fixing member 4475 presses the light transmitting substrate 4474 against the bottom of the recess 4472B of the frame member 4472 through the corresponding resilient member 4473 in order to rigidly secure it in position. The light transmitting substrate fixing member 4475 is a frame-shaped body showing a substantially rectangular contour in plan view and provided substantially at the center thereof with an aperture 4475A. More specifically, it presses the light transmitting substrate 4474 against the frame member 4472 along the inner periphery thereof that faces the aperture 4475A. The light transmitting substrate fixing member 4475 is additionally. provided with a pair of hook engaging sections 4475B respectively at the right and left edges thereof. As the hook engaging sections 4475B are brought into engaged with the respective hooks 44721 of the frame member 4472, the light transmitting substrate fixing member 4475 is rigidly secured to the frame member 4472 to press the light transmitting substrate 4472 between them.

[Structure of Support Member]

As shown in FIG. 2 or 3, the support member 448 is formed by using a frame-shaped plate showing a substantially rectangular contour in plan view and provided substantially at the center thereof with an aperture (not shown). It is adapted to support the optical modulator holders 447 and integrally combine the optical modulator holders 447 and the cross dichroic prism 444. The support member 448 may typically be made of an aluminum plate whose surface is subjected to a black Alumite treatment process. Alternatively, the support member 448 may be made of an iron type material whose thermal expansion coefficient is found to be substantially between the thermal expansion coefficient of aluminum that the optical modulator holders 447 are made of and that of the material of the cross dichroic prism 444.

The support member 448 is provided at each of the light-incident sides thereof with pin-shaped members 4481 that project from the plate at positions corresponding to the four insertion sections 4471C of the corresponding optical modulator holder 447.

Additionally, the support member 448 is provided at the upper side thereof with curved sections 4482 that are curved toward the light-irradiation side.

The support member 448 supports the optical modulator holders 447 as the pin-shaped members 4481 are inserted respectively into the four insertion sections 4471C of each of the optical modulator holders 447 and integrally combines the optical modulator holders 447 and the cross dichroic prism 444 as the light-irradiation sides of the plate are respectively bonded and rigidly secured to the light-incident sides of the irradiation-side polarizers 443 that are rigidly secured to the cross dichroic prism 444.

Thus, as the optical modulator holders 447 are rigidly secured to the cross dichroic prism 444 in the above-described manner, the curved sections 4482 of the support member 448 are arranged to cover the irradiation-side polarizers 443 from above (see FIG. 9).

[Structure of Fluid Feed-In Section]

Figure 8A:
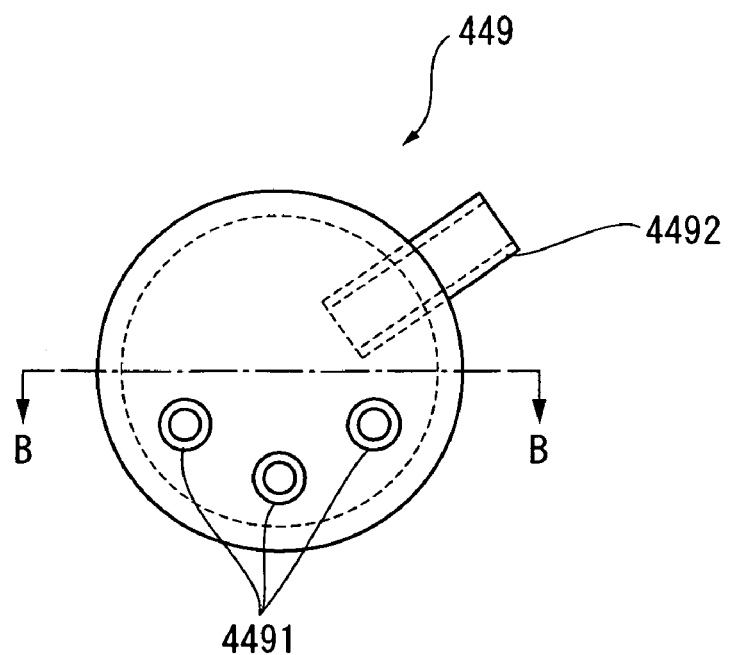
FIG. 8A is a schematic plan view of a fluid feed-in section of the first embodiment, showing the configuration thereof.
Figure 8B:
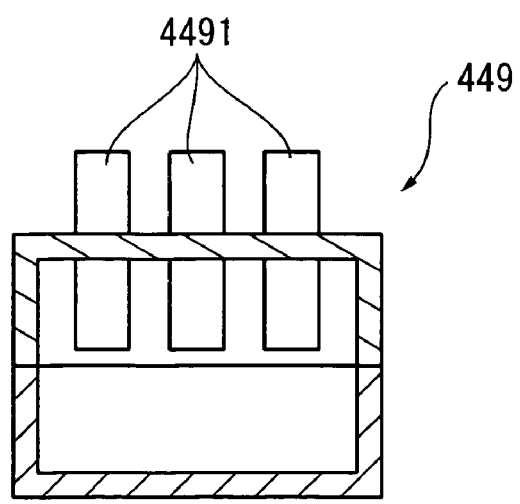
FIG. 8B is a cross sectional view taken along line B—B in FIG. 8A.

FIGS. 8A and 8B schematically illustrate the configuration of the fluid feed-in section 449. More specifically, FIG. 8A is a schematic plan view of the fluid feed-in section 449 and FIG. 8B is a schematic cross sectional view taken along line B—B in FIG. 8A.

The fluid feed-in section 449 is formed by using a hollow substantially cylindrical aluminum-made member and rigidly secured to the top surface of the cross dichroic prism 444 that is the surface intersecting the three light-incident surfaces thereof. The fluid feed-in section 449 collectively feeds in cooling fluid fed out from the optical modulator holders 447 and sends out cooling fluid to the outside.

As shown in FIGS. 8A and 8B, three cooling fluid flow-in sections 4491 are formed at the top surface the fluid feed-in section 449 to allow cooling fluid fed out from the frame members 4472 of the three optical modulator holders 447 to flow into the inside thereof. Each of the cooling fluid flow-in sections 4491 is formed by using a substantially tubular member having a diameter smaller than the diameter of the fluid circulating members 440 and arranged so as to project both to the inside and to the outside of the fluid feed-in section 449. As shown in FIG. 2, the end of each of the cooling fluid flow-in sections 4491 that projects to the outside is connected to one of the opposite ends of the corresponding fluid circulating member 440 whose other end is connected to the flow-out port 4472E of the frame member 4472 of the corresponding one of the three optical modulator holders 447 so as to allow cooling fluid fed out from the optical modulator holder 447 through the fluid circulating member 440 to collectively flow into the inside of the fluid feed-in section 449.

Additionally, as shown in FIGS. 8A and 8B, a cooling fluid flow-out section 4492 is formed at the lower side of the outer surface of the fluid feed-in section 449 to allow fed in cooling fluid to flow out to the outside. Like the cooling fluid flow-in sections 4491, the cooling fluid flow-out section 4492 is formed by using a substantially tubular member having a diameter smaller than the diameter of the fluid circulating members 440 and arranged so as to project both to the inside and to the outside of the fluid feed-in section 449. As shown in FIG. 2 or 3, the end of the cooling fluid flow-out sections 4492 that projects to the outside is connected to one of the opposite ends of one of the two fluid circulating members 440 connected to the fluid pressurizing/feeding section 445 for communication so that cooling fluid is fed out from the inside of the fluid feed-in section 449 into the fluid pressurizing/feeding section 445 through the fluid circulating member 440.

As described above, cooling fluid circulates through the flow path of the fluid pressurizing/feeding section 445—the fluid branching section 446—the optical modulator holders 447—the fluid feed-in section 449—the fluid pressurizing/feeding section 445 that are connected through the plurality of fluid circulating members 440.

[Cooling Structure]

Now, the cooling structure of the liquid crystal panels 441 will be described below.

FIG. 9 is a schematic cross sectional view illustrating cooling structure of one of the liquid crystal panels 441.

As the fluid pressurizing/feeding section 445 is driven, cooling fluid is fed into the inside of the fluid pressurizing/feeding section 445 from the inside of the fluid feed-in section 449 and then fed out from the fluid pressurizing/feeding section 445 to the fluid branching section 446 as shown in FIG. 9.

As shown in FIG. 9, cooling fluid fed into the fluid branching section 446 then flows out by way of each of the cooling fluid flow-out sections 4463 and then flows into the cooling chamber R1 of the corresponding optical modulator holder 447 through the related fluid circulating member 440.

Thus, the heat generated in the corresponding liquid crystal panel 441 by the light beams emitted from the light source 411 is transmitted to the cooling fluid in the cooling chamber R1.

The heat transmitted to the cooling fluid in the cooling chamber R1 then moves with the flow of cooling fluid through the cooling chamber R1—the fluid feed-in section 449—the fluid pressurizing/feeding section 445—the fluid branching section 446. As warmed cooling fluid flows into the fluid pressurizing/feeding section 445 and the fluid branching section 446, the heat contained in the cooling fluid is, if partly, discharged by way of the heat transmission route of the fluid pressurizing/feeding section 445 and the fluid branching section 446—the optical component casing 45. In other words, the optical component casing 45 operates also as radiator.

Then, the cooled cooling fluid once again moves to the fluid branching section 446—the cooling chamber R1.

Additionally, the cooling air introduced from the outside to the inside of the projector 1 by the sirocco fan 31 of the cooling unit 3 is then introduced into the optical component casing 45 through the holes (not shown) formed through the bottom of the optical component casing 45. The cooling air that is introduced into the optical component casing 45 then flows upward, cooling the light-incident side of the liquid crystal panel 441 and the light-irradiation side of the irradiation-side polarizer 442 as shown in FIG. 9.

Thus, three optical modulator holders 447 are fitted respectively to the three light-incident sides of the cross dichroic prism 444 through three support members 448 and a fluid feed-in section 449 is fitted to the top surface of the cross dichroic prism 444, while a fluid branching section 446 and a fluid pressurizing/feeding section 445 are laid one on the other on the lower surface of the cross dichroic prism 444. With this arrangement, the three liquid crystal panels 441, the three optical modulator holders 447, the plurality of fluid circulating members 440, the fluid branching section 446, the fluid feed-in section 449 and the fluid pressurizing/feeding section 445 are compactly disposed around the cross dichroic prism 444 so that the optical device 44 can be downsized if it has three liquid crystal panels 441.

Additionally, the fluid branching section 446 and the fluid feed-in section 449 can temporarily store cooling fluid in the inside thereof. In other words, the fluid branching section 446 and the fluid feed-in section 449 can operate as so many tanks. Therefore, the optical device 44 is provided with a sufficient capacity for containing cooling fluid without arranging a separate member that operates as tank so that the optical device 44 can be downsized further.

Still additionally, the optical component casing 45 is formed by using a metal-made member and the fluid branching section 446 and the fluid pressurizing/feeding section 445 are made of thermally highly conductive aluminum. Then, the fluid branching section 446 and the fluid pressurizing/feeding section 445 are arranged so as to pinch the bottom of the optical component casing 45. In other words, they are connected to the optical component casing 45 in such a way that heat can be transmitted from them to the optical component casing 45. With this arrangement, a circulative heat transmission route of cooling fluid—the fluid branching section 446 and the fluid pressurizing/feeding section 445—the optical component casing 45 is established to raise the cooling efficiency of cooling fluid. As a result, the optical component casing 45 operates as radiator so that it is possible to improve the cooling efficiency of cooling fluid without arranging a separate member that operates as radiator.

Thus, substantially all the components of the optical device 44 can be contained in the optical component casing 45. This arrangement provides the following advantages if compared with an arrangement where a radiator and a tank are disposed outside the optical component casing 45.

(1) Since a compact optical device 44 is realized to include a plurality of fluid circulating members 440, the plurality of fluid circulating members 440 can be arranged in a simple manner to dramatically improve the ease of handling the optical device 44.

(2) The plurality of fluid circulating members 440 can be connected to the optical device 44 with ease and certainty and cooling fluid is reliably prevented from leaking through the connecting areas of the fluid circulating members 440.

(3) The optical modulator holders are not subjected to particular force that is transmitted through any of the fluid circulating members 440 because it is not necessary to remove or arrange a radiator and/or a tank as pointed out above. In other words, the reactive force from the fluid circulating members 440 is reduced when assembling the optical device 44 and also when adjusting the positions of the liquid crystal panels 441 and the accuracy of positioning the liquid crystal panels 441 is improved.

(4) Since it is not necessary to arrange a radiator and/or a tank as pointed out above, it is possible to save space in the inside of the projector 1 and downsize the projector 1. At the same time, it is possible to make the projector 1 lightweight and reduce the cost of manufacturing the projector 1.

(5) It is not necessary to connect the fluid circulating members 440 to any radiator and/or any tank so that it is possible to reduce the length of each of the fluid circulating members 440 and, at the same time, the number of fluid circulating members 440. As a result, the rate at which cooling fluid flowing through the fluid circulating members 440 evaporates is reduced. Thus, the cycle of supplying cooling fluid is extended to further improve the convenience for the use of the projector 1.

(6) As both the length of each of the fluid circulating members 440 and the number of fluid circulating members 440 are reduced, it is possible to reduce the level of pressure necessary for feeding cooling fluid under pressure by means of the fluid pressurizing/feeding section 445. In other words, it is possible to reduce the number of revolutions per unit time of the fluid pressurizing/feeding section 445 in operation and hence the noise level of the fluid pressurizing/feeding section 445 itself. Thus, it is possible to realize a very calm projector 1.

Since the optical device 44 is provided with the fluid pressurizing/feeding section 445, cooling fluid is forced to circulate through the flow path of the fluid pressurizing/feeding section 445—the fluid branching section 446—the optical modulator holders 447—the fluid feed-in section 449—the fluid pressurizing/feeding section 445 that are connected by way of the plurality of fluid circulating members 440 and hence it is possible to avoid cooling fluid that is warmed by the liquid crystal panels 441 from staying in the cooling chambers R1 of the optical modulator holders 447. Then, it is possible to maintain the temperature difference between the liquid crystal panels 441 and the cooling fluid and efficiently cool the liquid crystal panels 441 by cooling fluid.

Since the fluid branching section 446 and the fluid feed-in section 449 are arranged respectively at the upstream side and at the downstream side of the cooling chambers R1, it is possible to raise the rate of convection of cooling fluid in the cooling chambers R1 so as to maintain the temperature difference between the liquid crystal panels 441 and the cooling fluid and further efficiently cool the liquid crystal panels 441 by cooling fluid.

Additionally, since the fluid branching section 446 is fitted to the lower surface of the cross dichroic prism 444, it is possible to reduce the distance separating the fluid branching section 446 and the flow-in port 4472D of each of the optical modulator holders 447 and hence the cooling fluid that is divided and fed out from the fluid branching section 446 is allowed to smoothly flow into the cooling chambers R1 of the optical modulator holders 447.

Still additionally, since the irradiation-side polarizers 443 are reflection type polarizers that are adapted to reflect light beams having an axis of polarization other than the predetermined axis of polarization, they hardly generate heat and hence it is possible to reduce the temperature of the irradiation-side polarizers 443 themselves if compared with absorption type polarizers adapted to absorb light beams having an axis of polarization other than the predetermined axis of polarization. As a result, it is no longer necessary to bring in a conventional structure where not only the liquid crystal panels but also the polarization plates are held in contact with the cooling fluid in the cooling chambers to cool the polarization plates. In other words, it is no longer necessary to adopt an arrangement where not only the liquid crystal panels 441 but also the irradiation-side polarizers 443 are held by the optical modulator holders 447. Thus, it is possible to efficiently cool the liquid crystal panels 441 without raising the temperature of the cooling fluid in the inside of the cooling chambers R1 of the optical modulator holders 447.

Still additionally, since the irradiation-side polarizers 443 are adapted to reflect light beams having an axis of polarization other than the predetermined axis of polarization in a direction that can effectively avoid the image forming regions of the liquid crystal panels 441, no straying light is generated in the optical device 44 and hence the optical images formed on the liquid crystal panels 441 are stably maintained to consequently produce a fine optical image.

Furthermore, since each of the irradiation-side polarizers 443 has two rectangular prisms 443A and a reflection type polarization film 443B and the rectangular prism 443A that is arranged at the light-incident side is adapted to totally and upwardly reflect all light beams reflected by the reflection type polarization film 443B at its light-incident side, it is possible to avoid any straying light from being generated in the optical device 44.

Finally, since the projector 1 has an optical device 44 that can efficiently cool the liquid crystal panels 441 and reduce the temperature of the irradiation-side polarizers 443, it is possible to prevent the liquid crystal panels 441 and the irradiation-side polarizers 443 from thermal degradation and prolong the service life of the projector 1.

2nd Embodiment

Now, the second embodiment of the present invention will be described by referring to the related drawings.

In the following description, the structures and the members identical with those of the above-described second embodiment are denoted respectively by the same reference symbols and will not be described any further.

The fluid branching section 446 of the optical device 44 is fitted to the lower surface of the cross dichroic prism 444 in the above described first embodiment. Additionally, the fluid pressurizing/feeding section 445 of the optical device 44 is integrally formed with the fluid branching section 446 so as to pinch the bottom of the optical component casing 45 between itself and the fluid branching section 446.

On the other hand, the fluid pressurizing/feeding section 545 of the optical device 54 is fitted to the lower surface of the cross dichroic prism 444 and the fluid branching section 546 is fitted to the lower surface of the fluid pressurizing/feeding section 545 in the second embodiment. The second embodiment is structurally identical with the first embodiment except the fluid pressurizing/feeding section 545 and the fluid branching section 546.

Figure 10:
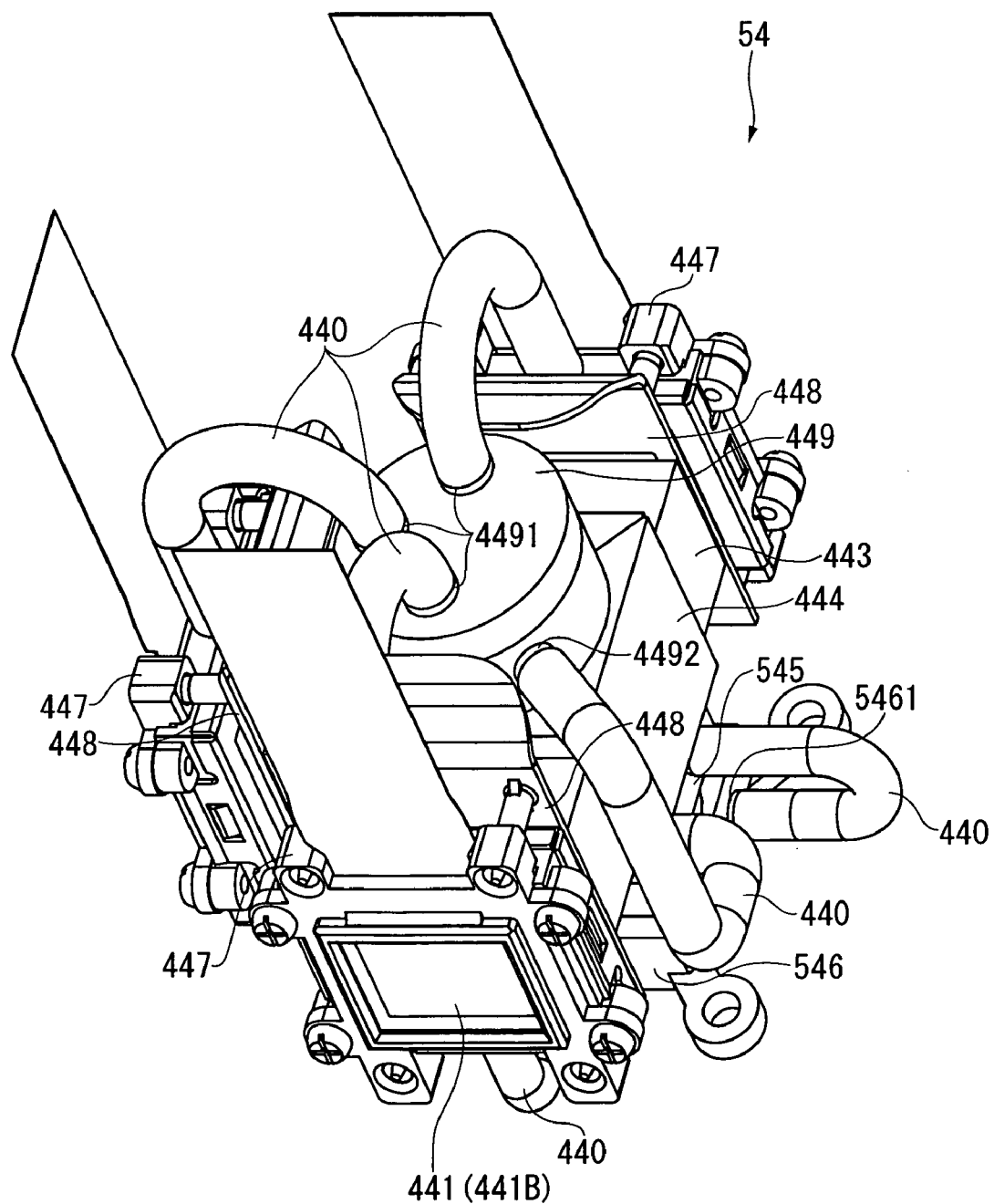
FIG. 10 is a schematic perspective view of an optical device of a second embodiment.
Figure 11:
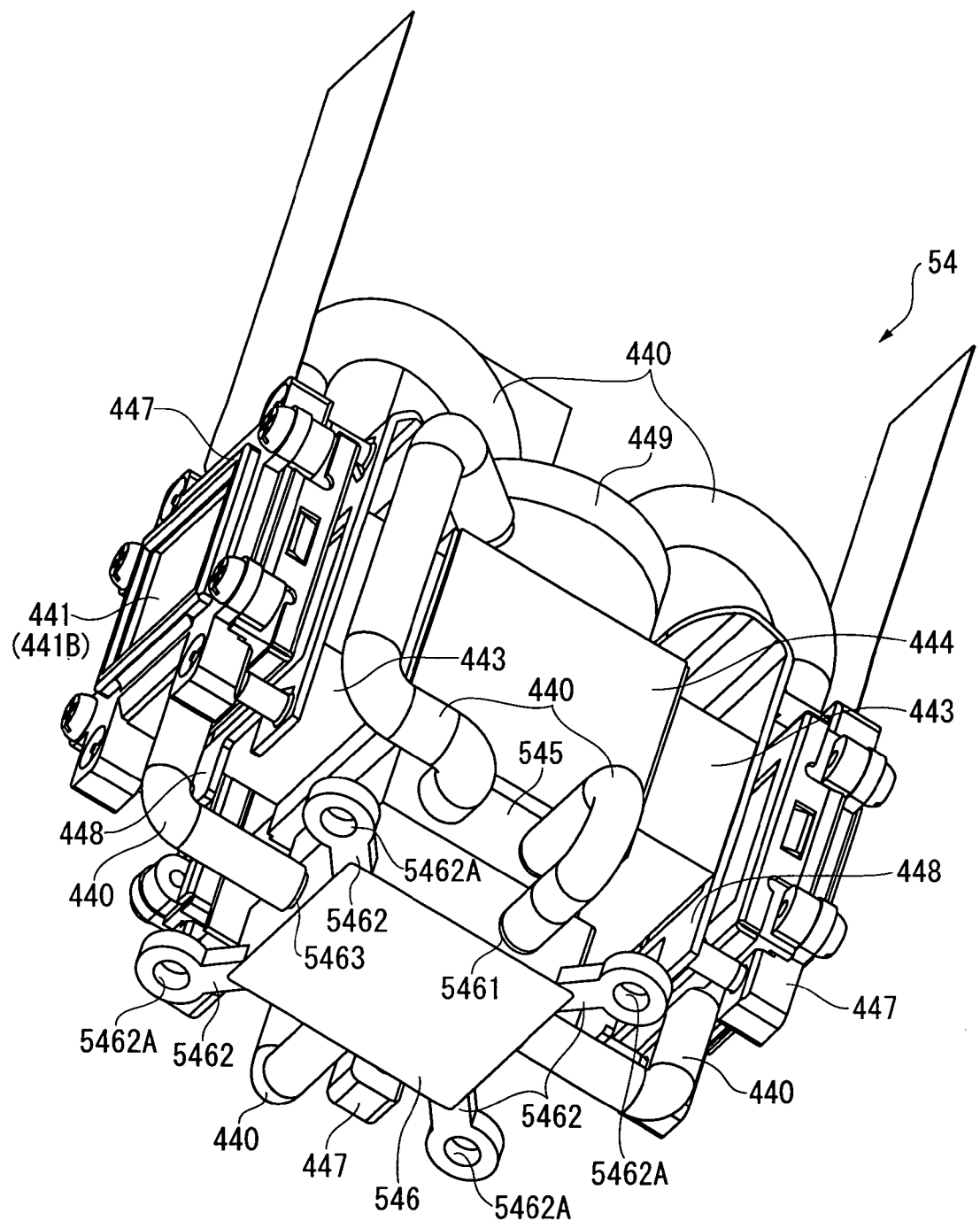
FIG. 11 is another schematic perspective view of the second embodiment.

FIGS. 10 and 11 schematically illustrate the configuration of the optical device 54 of the second embodiment. More specifically, FIG. 10 is a schematic perspective view of the optical device 54 as viewed from above and FIG. 11 is a schematic perspective view of the optical device 54 as viewed from below.

The fluid pressurizing/feeding section 545 is identical with the above-described fluid pressurizing/feeding section 445 of the first embodiment in terms of function and profile. As shown in FIG. 10 or FIG. 11, the fluid pressurizing/feeding section 545 is fitted to the lower surface of the cross dichroic prism 444 that is the surface intersecting the three light-incident surfaces of the cross dichroic prism 444.

The fluid branching section 546 is identical with the above-described fluid branching section 446 of the first embodiment in terms of function and profile. The section 546 includes cooling fluid flow-in section 5461, arm sections 5462 (including holes 5462A), cooling fluid flow-out sections 5463 and a protruding section (not shown) that are respectively similar to the cooling fluid flow-in section 4461, the arm sections 4462 (including holes 4462A), the cooling fluid flow-out sections 4463 and the protruding section 4464 of the fluid branching section 446 of the first embodiment. The section 546 also includes a protruding section (not shown).

Substantially like the first embodiment, as the lower surface of the fluid pressurizing/feeding section 545 that is fitted to the lower surface of the cross dichroic prism 444 is brought to abut the protruding section of the fluid branching section 546, it becomes possible to regulate the upward angular position of the cross dichroic prism 444 relative to the fluid branching section 546.

As in the case of the above-described first embodiment, the optical device 54 is rigidly fitted to the component containing member as screws (not shown) are driven through the respective holes 5462A of the fluid branching section 546 in order to rigidly fit the fluid branching section 546 to the component containing member (not shown) of the optical component casing 45. At the same time, the fluid branching section 546 and the optical component casing 45 are connected so as to be able to transmit heat to each other. Then, the fluid pressurizing/feeding section 545 and the fluid branching section 546 are arranged in the inside of the optical component casing 45 (see FIG. 12).

Figure 12:
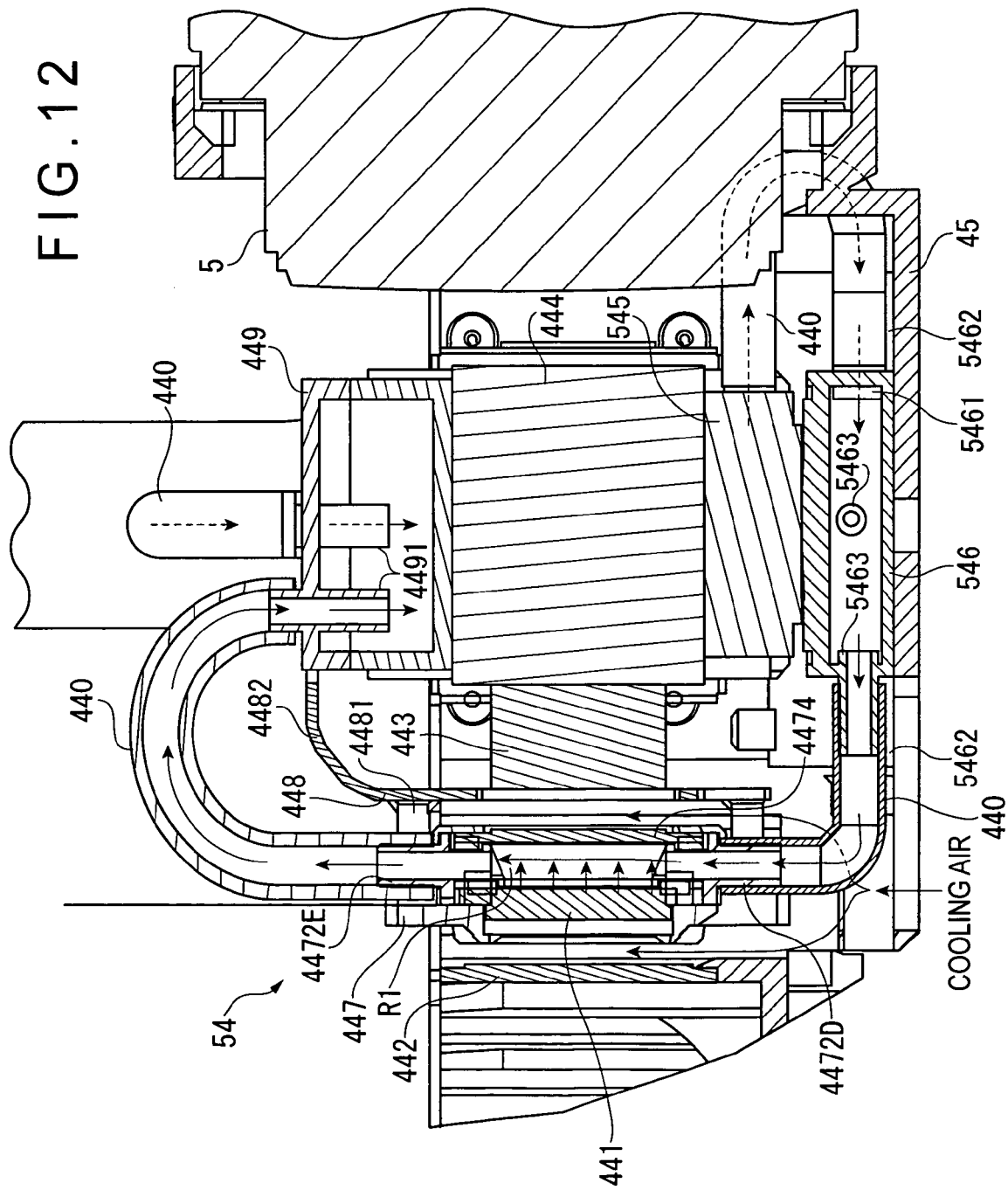
FIG. 12 is a cross sectional view of the second embodiment, illustrating the cooling structure of a liquid crystal panel thereof.

FIG. 12 is a schematic cross sectional view illustrating the cooling structure of one of the liquid crystal panels 441.

As seen from FIG. 12, the cooling structure of each of the liquid crystal panels 441 of the second embodiment is substantially same as the above-described cooling structure of the first embodiment so that it will not be described in greater detail hereinafter.

However, if compared with the above-described first embodiment, the fluid pressurizing/feeding section 545 and the fluid branching section 546 are integrated with each other and the fluid pressurizing/feeding section 545 is fitted to the lower surface of the cross dichroic prism 444 in the second embodiment so that all the components of the optical device 54 are contained in the optical component casing 45 as screws are driven through the holes 5462A of the fluid branching section 546 and then into the bottom surface of the optical component casing 45. Thus, the ease of handling the optical device 54 is further improved to make it very easy to install it into the optical component casing 45.

Additionally, since the fluid pressurizing/feeding section 545 and the fluid branching section 546 are integrated with each other so as to be able to transmit heat to each other, a heat transmission route of the fluid pressurizing/feeding section 545—the fluid branching section 546—the optical component casing 45 is established in addition to the heat transmission route of the fluid branching section 546—the optical component casing 45. Therefore, it is possible to maintain a satisfactory cooling efficiency for cooling circulating cooling fluid.

3rd Embodiment

Now, the third embodiment of the present invention will be described by referring to the related drawing;

In the following description, the structures and the members identical with those of the above-described first embodiment are denoted respectively by the same reference symbols and will not be described any further.

In the second embodiment, the optical component casing 45 operates as radiator and heat is discharged from the circulating cooling fluid to the optical component casing 45.

The third embodiment differs from the second embodiment only in that a radiator 641 is added to the optical device 54 of the second embodiment. Otherwise, the third embodiment is identical with the above-described second embodiment.

Figure 13:
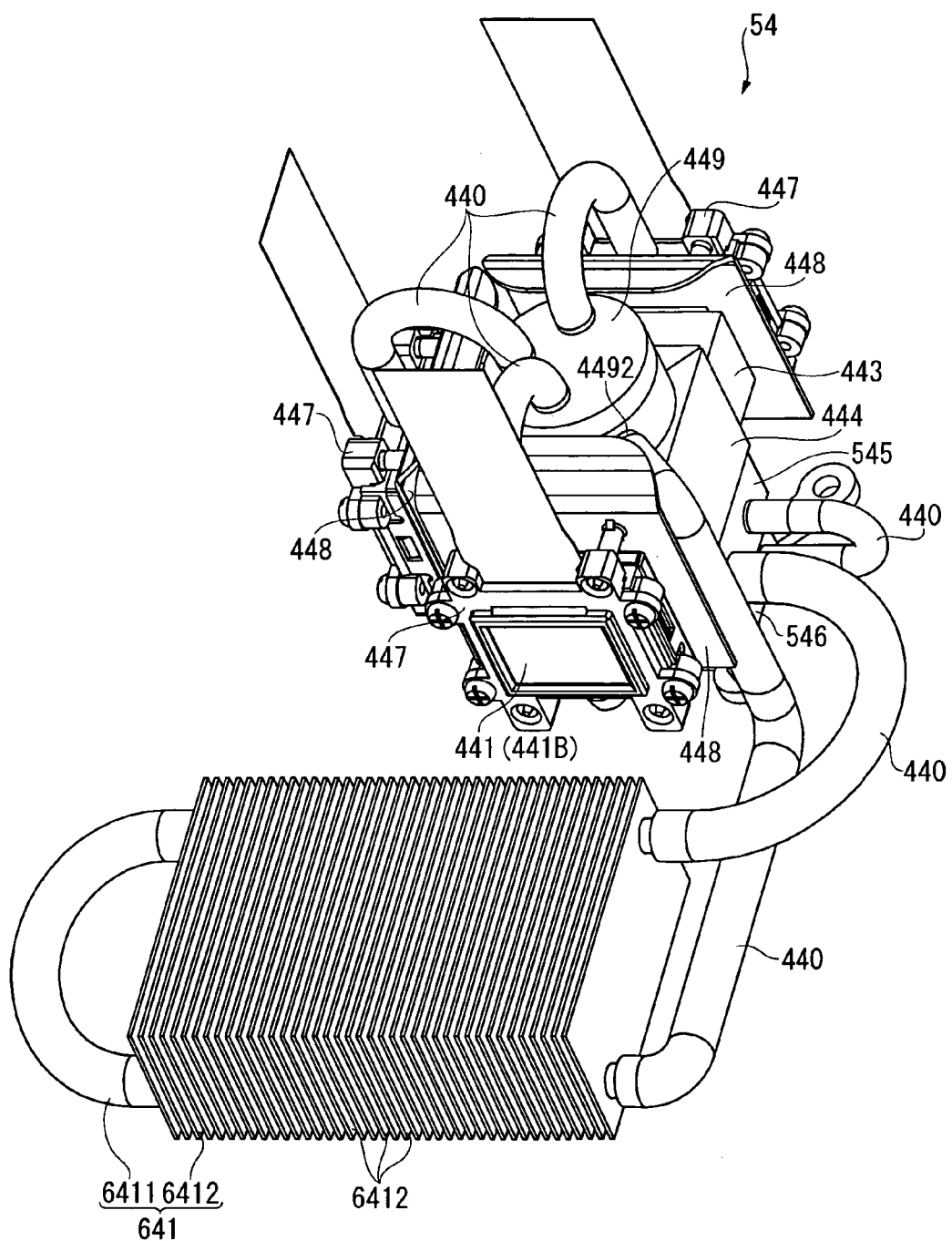
FIG. 13 is a schematic illustration of the structure and the positional arrangement of a radiator of a third embodiment.

FIG. 13 is a schematic illustration of the structure and the positional arrangement of the radiator of the third embodiment.

The radiator 641 that operates as heat discharging section is inserted in the flow path of cooling fluid between the fluid feed-in section 449 and the fluid pressurizing/feeding section 545 and adapted to discharge heat from the cooling fluid heated by the liquid crystal panels 441 and flowing out from the fluid feed-in section 449. As shown in FIG. 13, the radiator 641 has a tubular member 6411 and a plurality of fins 6412.

The tubular member 6411 is made of aluminum and, as shown in FIG. 13, extends to show a substantially U-shaped profile in plan view. The U-shaped tubular member 6411 has a diameter smaller than that of the fluid circulating members 440 and is connected at an end thereof to one of the opposite ends of the fluid circulating member 440 whose other end is connected to the cooling fluid flow-out section 4492 of the fluid feed-in section 449. The other end of the U-shaped tubular member 6411 is connected to one of the opposite ends of the fluid circulating member 440 whose other end is connected to the fluid pressurizing/feeding section 545 also as shown in FIG. 13. Thus, the cooling fluid that is flowing out of the fluid feed-in section 449 passes through the tubular member 6411 through the corresponding fluid circulating member 440. Then, it flows into the fluid pressurizing/feeding section 545 through the corresponding fluid circulating member 440.

The heat discharging fins 6412 are typically formed by using plates that are made of a thermally conductive material such as metal in such a way that they allow the tubular member 6411 to pass through them and heat can be transmitted from the tubular member 6411 to the heat discharging fins 6412. The plurality of heat discharging fins 6412 are arranged to extend in a direction perpendicular to the running direction of the tubular member 6411 in parallel with each other in the running direction of the tubular member 6411.

As described above, in this embodiment, cooling fluid circulates in the flow path of the fluid pressurizing/feeding section 545—the fluid branching section 546—the optical modulator holders 447—the fluid feed-in section 449—the radiator 641—the fluid pressurizing/feeding section 545 that are connected through a plurality of fluid circulating members 440

The cooling structure of the liquid crystal panels 441 of the third embodiment is identical with the cooling structure of the second embodiment except that heat is discharged from the cooling fluid running through the tubular member 6411 of the radiator 641 to the tubular member 6411—the heat discharging fins 6412. Therefore, the cooling structure of the third embodiment will not be described any further.

A cooling fan may be arranged near the radiator 641 to blow cooling air to the heat discharging fins 6412 of the radiator 641 or an arrangement may be made to suck in air from the vicinity of the heat discharging fins 6412. With such an arrangement, the heat discharging fins 6412 can be cooled efficiently to by turn improve the efficiency of cooling cooling fluid.

Since the above-described third embodiment differs from the second embodiment in that a radiator 641 is added to the optical device 54, the cooling fluid flowing from the fluid feed-in section 449 to the fluid pressurizing/feeding section 545 can be cooled by the radiator 641 to reduce the temperature of the cooling fluid accumulated in the fluid branching section 546. Therefore, it is further possible to efficiently cool the liquid crystal panels 441 by cooled cooling fluid flowing from the fluid branching section 546 to the cooling chambers R1 of the optical modulator holders 447.

Additionally, as a result of adding the radiator 641, the optical component casing 45 is exempted from the role of operating as radiator and hence it is not necessary to form the optical component casing 45 by using a thermally conductive material such as metal. Then, the degree of freedom of designing the optical component casing 45 will be increased. For example, a lightweight projector 1 can be realized by using lightweight synthetic resin for the optical component casing 45.

While the present invention is described above in detail by way of preferred embodiments, the present invention is by no means limited to the above-described embodiments, which may be modified and/or altered in various different ways without departing from the scope of the present invention.

While each of the optical modulator holders 447 has a single cooling chamber in the above description of the preferred embodiments, the present invention is not limited thereto. For example, in each of the optical modulator holders 447, the frame member 4471 may be made to have a structure substantially same as the frame member 4472 and the light transmitting substrate 4474 and the light transmitting substrate fixing member 4475 may be arranged at the light-incident side of the frame member 4471. With such an arrangement, the sides of the apertures of the paired frame members 4471, 4472 that are located vis-à-vis are closed by the corresponding liquid crystal panel 441 and the sides of the apertures opposite to the above-described sides are closed by a pair of light transmitting substrates 4474 so that two cooling chambers are formed respectively at the light-incident side and at the light-irradiation side of the liquid crystal panel 441.

When two cooling chambers are formed in a manner as described above, the paired frame members 4471, 4472 may be provided with respective communication apertures and the cooling chambers formed respectively in the insides of the paired frame members 4471, 4472 may be held in communication with each other by way of the communication apertures.

The cooling chamber R1 of each of the optical modulator holders 447 is formed at a position selected by taking the image forming region of the corresponding liquid crystal panel 441 into consideration in the above embodiments, it may be formed at any position so long as the liquid crystal panel 441 is held in such a way that heat can be transmitted to the cooling fluid in the inside thereof. For example, the cooling chamber R1 may be formed at a position outside the image forming region of the liquid crystal panel 441.

The flow-in port 4472D and the flow-out port 4472E of each of the optical modulator holders 447 may not be formed at the above-described respective positions of the embodiments. In other words, they may be formed at some other positions. For example, the flow-in port 4472D and the flow-out port 4472E may be switched so as to operate respectively as a flow-out port and a flow-in port so that cooling fluid may be made to flow inversely.

While the incident-side polarization plates 442 are described as absorption type polarizers in each of the above-described embodiments, they may alternatively be made to operate as reflection type polarizers adapted to transmit light beams having a predetermined axis of polarization and reflect light beams having any other axis of polarization. In other words, they may operate like the irradiation-side polarizers 443.

The incident-side polarization plates 442 and the irradiation-side polarizers 443 are separated from the corresponding liquid crystal panels 441 in the above-described embodiments. However, the present invention is by no means limited thereto. For example, the irradiation-side polarizers 443 may be realized by absorption type polarizers to replace the light transmitting substrate 4474. Alternatively, each of the optical modulator holders 447 may be made to have two cooling chambers, one at the light-incident side and one at the light-irradiation side of the corresponding liquid crystal panel 441 in a manner as described above and the incident-side polarization plates 442 and the above-described irradiation-side polarizers may be arranged in place of the pair of light transmitting substrates 4474.

While a radiator 641 is added to the optical device 54 of the second embodiment in the above-described third embodiment, the radiator 641 may alternatively added to the optical device 44 of the first embodiment. While a radiator 641 is used for the heat discharging section in the above-described third embodiment, it is by no means limited thereto and a Peltier module that is connected to the cooling fluid flowing through a plurality of fluid circulating members 440 so as to be able to transmit heat and utilizes the Peltier effect may be adopted for the heat discharging section.

While the members to be held in contact with cooling fluid including the fluid circulating members 440, the fluid pressurizing/feeding section 445, 545, the frame members 4471, 4472, the fluid branching section 446, 546, the fluid feed-in section 449 and the tubular member 6411 of the radiator 641 are made of aluminum in the above-described embodiments, the present invention is by no means limited thereto. They may alternatively be made of some other material so long as it is an anti-corrosive material. For instance, they may be made of oxygen-free copper or [duralumin]. The fluid circulating members 440 may be made of butyl rubber or fluorocarbon rubber that shows a low hardness level because such a material reduces the deformation reactive force relative to the optical modulator holders 447 and suppresses positional displacements of pixels.

While the flow rate of cooling fluid flowing into the cooling chamber R1 of each of the optical modulator holders 447 is set to the substantially same level in each of the above-described embodiments, the present invention is not limited thereto and the flow rate of cooling fluid flowing into the cooling chamber R1 may be differentiated among the optical modulator holders.

For example, a valve may be arranged in the flow path of cooling chamber from the fluid branching section 446, 546 to each cooling chamber R1 and the flow path may be broadened or narrowed by controlling the valve.

Alternatively, the diameter of each of the fluid circulating members 440 that connect the fluid branching section 446, 546 and the cooling chambers R1 may be differentiated depending on the rate of heat generation of each of the liquid crystal panels 441R, 441G, 441B.

While the fluid branching section 446, 546 and the fluid feed-in section 449 have a cooling fluid flow-in section 4461, 5461, 4491 and a cooling fluid flow-out section 4463, 5463, 4492 and the cooling fluid flow-in section 4461, 5461, 4491 and the cooling fluid flow-out section 4463, 5463, 4492 have one of the opposite ends projecting into the inside in the above-described embodiments, the present invention is by no means limited thereto. For example, the fluid branching section 446, 546 and the fluid feed-in section 449 may be directly connected to a fluid circulating member 440 for communication and the proximal end of the fluid circulating member 440 may be made to project into the fluid branching section 446, 546 or the fluid feed-in section 449, whichever appropriate.

While a sirocco fan 31 is used to blow air for cooling the outer surfaces of optical modulator holders 447 and the bottom surface of the optical component casing 45 in the above-described embodiments, the present invention is by no means limited thereto. The object of the present invention can be achieved without using a sirocco fan 31. Then, the projector 1 will minimally emit noises.

While the optical unit 4 of each of the above-described embodiments shows a substantially L-shaped contour in plan view, the present invention is by no means limited thereto. For example, the optical unit 4 may show a substantially U-shaped contour in plan view.

While a projector 1 using three liquid crystal panels 441 is cited in each of the above-described embodiments, the present invention is equally applicable to a projector using two liquid crystal panels or four or more than four liquid crystal panels.

While transmission type liquid crystal panels having a light incidence surface and a light irradiation surface that are different from each other are used in each of the above-described embodiments, reflection type liquid crystal panels having a surface that operates both as a light incident surface and a light irradiation surface may alternatively be used for the purpose of the present invention.

While liquid crystal panels are used as optical modulators in each of the above-described embodiments, optical modulators other than liquid crystal panels such as devices using micro-mirrors may alternatively be used for the purpose of the present invention. Then, the polarization plates arranged at the light-incident side and at the light-irradiation side can be omitted.

While the present invention is described in terms of a so-called front type projector adapted to project an image onto a screen in the viewing direction in each of the above-described embodiments, the present invention is also applicable to a so-called rear type projector adapted to project an image onto a screen in the direction opposite to the viewing direction.

While the presently best modes for carrying out the present invention are described above, the present invention is by no means limited thereto. Differently stated, while the present invention is described above in terms of specific embodiments and illustrations, they can be modified in various different ways in terms of profile, material and number of components without departing from the technical concept and the scope of the present invention.

Therefore, the profiles and the materials that are specifically described above are given only for the purpose of easy understanding of the present invention and by no means limit the scope of the present invention. Thus, any description involving the denominations of the components and the elements of the present invention without limiting the profile and the material thereof, if partly, is also within the scope of the present invention.

The priority application Number JP2004-084808 upon which this patent application is based is hereby incorporated by reference.

What is claimed is:

1. An optical device constituted including a plurality of optical modulators for forming optical images by modulating light beams emitted from a light source according to image information, the device comprising:
   a plurality of optical modulator holders respectively having cooling chambers, in which cooling fluid is sealed, for holding the plurality of optical modulators so as to allow them to transmit heat to the cooling fluid contained in the cooling chambers;
   a plurality of fluid circulating members communicated with the cooling chambers of the optical modulator holders for guiding the cooling fluid to the outside of the cooling chambers and again guiding the cooling fluid into the inside of the cooling chambers;

a color combining optical device having a plurality of light-incident surfaces, on which the plurality of optical modulator holders are respectively attached, for combining the light beams modulated by the plurality of optical modulators;

a fluid branching section arranged on the flow paths of cooling fluid formed by the plurality of fluid circulating members and adapted to store cooling fluid therein and allow the cooling fluid to branch to each of the plurality of optical modulator holders to flow into each of the cooling chambers;

a fluid feed-in section arranged on the flow paths of cooling fluid formed by the plurality of fluid circulating members and adapted to accumulate the cooling fluid therein and to collectively feed the cooling fluid flowed out from the cooling chambers through the plurality of fluid circulating members; and a fluid pressurizing/feeding section arranged on the flow paths of cooling fluid formed by the plurality of fluid circulating members for feeding in the cooling fluid from the inside of the fluid feed-in section through the plurality of fluid circulating members and pressurizing and feeding the fed cooling fluid to the inside of the fluid branching section through the plurality of fluid circulating members so as to force the circulation of the cooling fluid; wherein the fluid branching section and the fluid pressurizing/feeding section are arranged one on the other on one of the surfaces of the color combining optical device intersecting the plurality of light-incident surfaces; and the fluid feed-in section is fitted to the other one of the surfaces of the color combining optical device intersecting the plurality of light-incident surfaces.

2. The optical device according to claim 1, wherein the fluid branching section is fitted to the one of the surfaces of the color combining optical device.

3. The optical device according to claim 1, wherein the fluid pressurizing/feeding section is fitted to the one of the surfaces of the color combining optical device.

4. The optical device according to claim 1, further comprising:

a heat discharging section arranged on the flow path of cooling fluid formed by arranging the plurality of fluid circulating members from the fluid feed-in section to the fluid pressurizing/feeding section in order to discharge heat from the cooling fluid.

5. The optical device according to claim 1, wherein the fluid branching section and the fluid pressurizing/feeding section are made of a thermally conductive material and connected to each other so as to be able to transmit heat to each other.

6. The optical device according to claim 1, further comprising:

a plurality of reflection type polarizers fitted to the respective light-incident surfaces of the color combining optical device and adapted to transmit the light beams emitted from the plurality of optical modulators and having a predetermined axis of polarization and reflect the light beams emitted from the plurality of optical modulators and having an axis of polarization other than the predetermined axis of polarization; wherein the reflection type polarizers reflects the light beams having an axis of polarization other than the predetermined axis of polarization in a direction avoiding the image forming regions of the optical modulators.

7. The optical device according to claim 6, wherein each of the reflection type polarizers is formed by a plurality of prisms that are connected to each other and a reflection type polarization film arranged between the plurality of prisms and adapted to transmit the light beams, which are emitted from the corresponding optical modulator, having a predetermined axis of polarization and reflect the light beams having an axis of polarization other than the predetermined axis of polarization; and the plurality of prisms of each of the reflection type polarizers include an incident-side prism having a light-incident surface that is arranged at the light-incident side and operates both as a transmission surface for the light beams emitted from the optical modulator and as a total reflection surface for the light beams reflected by the reflection type polarization film;

the incident-side prism being adapted to reflect the light beams reflected by the reflection type polarization film at the total reflection surface and emit them in a direction avoiding the image forming regions of the optical modulators.

8. A projector comprising a light source, an optical device and a projection optical device for enlarging and projecting the optical image formed by the optical device, wherein the optical device is constituted including a plurality of optical modulators for forming optical images by modulating light beams emitted from a light source according to image information, the device further comprising:

a plurality of optical modulator holders respectively having cooling chambers, in which cooling fluid is sealed, for holding the plurality of optical modulators so as to allow them to transmit heat to the cooling fluid contained in the cooling chambers;

a plurality of fluid circulating members communicated with the cooling chambers of the optical modulator holders for guiding the cooling fluid to the outside of the cooling chambers and again guiding the cooling fluid into the inside of the cooling chambers;

a color combining optical device having a plurality of light-incident surfaces, on which the plurality of optical modulator holders are respectively attached, for combining the light beams modulated by the plurality of optical modulators;

a fluid branching section arranged on the flow paths of cooling fluid formed by the plurality of fluid circulating members and adapted to store cooling fluid therein and allow the cooling fluid to branch to each of the plurality of optical modulator holders to flow into each of the cooling chambers;

a fluid feed-in section arranged on the flow paths of cooling fluid formed by the plurality of fluid circulating members and adapted to accumulate the cooling fluid therein and to collectively feed the cooling fluid flowed out from the cooling chambers through the plurality of fluid circulating members; and a fluid pressurizing/feeding section arranged on the flow paths of cooling fluid formed by the plurality of fluid circulating members for feeding in the cooling fluid from the inside of the fluid feed-in section through the plurality of fluid circulating members and pressurizing and feeding the fed cooling fluid to the inside of the fluid branching section through the plurality of fluid circulating members so as to force the circulation of the cooling fluid; wherein the fluid branching section and the fluid pressurizing/feeding section are arranged one on the other on one of the surfaces of the color combining optical device intersecting the plurality of light-incident surfaces; and the fluid feed-in section is fitted to the other one of the surfaces of the color combining optical device intersecting the plurality of light-incident surfaces.

9. The projector according to claim 8, wherein projector further comprises an optical component casing made of a thermally conductive material for containing the optical device at a predetermined position relative to the projection optical device; and at least either the fluid branching section or the fluid pressurizing/feeding section is made of a thermally conductive material and, when the optical device is contained in the optical component casing, connected to the optical component casing so as to be able to transmit heat thereto.

10. The projector according to claim 8, wherein the fluid branching section is fitted to the one of the surfaces of the color combining optical device.

11. The projector according to claim 8, wherein the fluid pressurizing/feeding section is fitted to the one of the surfaces of the color combining optical device.

12. The projector according to claim 8, further comprising:

a heat discharging section arranged on the flow path of cooling fluid formed by arranging the plurality of fluid circulating members from the fluid feed-in section to the fluid pressurizing/feeding section in order to discharge heat from the cooling fluid.

13. The projector according to claim 8, wherein the fluid branching section and the fluid pressurizing/feeding section are made of a thermally conductive material and connected to each other so as to be able to transmit heat to each other.

14. The projector according to claim 8, further comprising:

a plurality of reflection type polarizers fitted to the respective light-incident surfaces of the color combining optical device and adapted to transmit the light beams emitted from the plurality of optical modulators and having a predetermined axis of polarization and reflect the light beams emitted from the plurality of optical modulators and having an axis of polarization other than the predetermined axis of polarization; wherein the reflection type polarizers reflects the light beams having an axis of polarization other than the predetermined axis of polarization in a direction avoiding the image forming regions of the optical modulators.

15. The projector according to claim 14, wherein each of the reflection type polarizers is formed by a plurality of prisms that are connected to each other and a reflection type polarization film arranged between the plurality of prisms and adapted to transmit the light beams, which are emitted from the corresponding optical modulator, having a predetermined axis of polarization and reflect the light beams having an axis of polarization other than the predetermined axis of polarization; and the plurality of prisms of each of the reflection type polarizers include an incident-side prism having a light-incident surface that is arranged at the light-incident side and operates both as a transmission surface for the light beams emitted from the optical modulator and as a total reflection surface for the light beams reflected by the reflection type polarization film;

the incident-side prism being adapted to reflect the light beams reflected by the reflection type polarization film at the total reflection surface and emit them in a direction avoiding the image forming regions of the optical modulators.

* * * * *